(12) United States Patent
Jung et al.

(10) Patent No.: US 10,551,654 B2
(45) Date of Patent: Feb. 4, 2020

(54) DISPLAY DEVICE

(71) Applicant: LG ELECTRONICS INC., Seoul (KR)

(72) Inventors: Kisang Jung, Seoul (KR); Sangwook Kwak, Seoul (KR); Seongrae Cho, Seoul (KR); Changeon Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/046,121

(22) Filed: Jul. 26, 2018

(65) Prior Publication Data

US 2019/0094602 A1 Mar. 28, 2019

(30) Foreign Application Priority Data

Sep. 25, 2017 (KR) .......................... 10-2017-0123628

(51) Int. Cl.
*G02F 1/1333* (2006.01)
*F21V 8/00* (2006.01)
*G02F 1/1335* (2006.01)

(52) U.S. Cl.
CPC ..... *G02F 1/133308* (2013.01); *G02B 6/0068* (2013.01); *G02B 6/0088* (2013.01); *G02F 1/133603* (2013.01); *G02F 1/133608* (2013.01); *G02F 2001/13332* (2013.01); *G02F 2001/133314* (2013.01); *G02F 2001/133317* (2013.01); *G02F 2001/133322* (2013.01); *G02F 2201/46* (2013.01)

(58) Field of Classification Search
CPC .............................................. G02F 1/133308
See application file for complete search history.

(56) References Cited

U.S. PATENT DOCUMENTS

| 8,786,796 | B2* | 7/2014 | Ito | G02F 1/133308 |
| | | | | 349/58 |
| 8,897,018 | B2* | 11/2014 | Suwa | H04N 5/64 |
| | | | | 361/679.01 |
| 2001/0036057 | A1* | 11/2001 | Fukuyoshi | G02F 1/133308 |
| | | | | 361/679.26 |
| 2002/0080297 | A1* | 6/2002 | Sung | G02F 1/133308 |
| | | | | 349/58 |
| 2003/0103173 | A1* | 6/2003 | Satonaka | G02F 1/133308 |
| | | | | 349/58 |
| 2004/0184224 | A1* | 9/2004 | Kumagai | G06F 1/1616 |
| | | | | 361/679.27 |
| 2013/0057783 | A1 | 3/2013 | Horii et al. | |
| 2013/0235277 | A1 | 9/2013 | Suwa et al. | |

FOREIGN PATENT DOCUMENTS

| KR | 10-2012-0073618 A | 7/2012 |
| KR | 10-2013-0019972 A | 2/2013 |
| KR | 10-1749714 B1 | 7/2017 |

* cited by examiner

*Primary Examiner* — Anh T Mai
*Assistant Examiner* — Zachary J Snyder
(74) *Attorney, Agent, or Firm* — Birch, Stewart, Kolasch & Birch, LLP

(57) ABSTRACT

A display device is disclosed. The display device includes a display panel, a front cover including a first side wall covering one side of the display panel and a hook provided on an outer surface of the first sidewall, and a back cover coupled to the front cover. The back cover includes a rear wall positioned behind the front cover, a second side wall bent forward from the rear wall and covering the first side wall, and a latching portion bent toward inside of the second side wall and engaged with the hook.

18 Claims, 28 Drawing Sheets

DISPLAY DEVICE

This application claims the priority benefit of Korean Patent Application No. 10-2017-0123628 filed on Sep. 25, 2017, the entire contents of which is incorporated herein by reference for all purposes as if fully set forth herein.

BACKGROUND OF THE INVENTION

Field of the Invention

Embodiments of the invention relate to a display device.

Discussion of the Related Art

As the information society develops, demand for display devices is increasing in various forms. Recently, in response to this, various display devices such as a liquid crystal display (LCD), a plasma display panel (PDP), an electro luminescent display (ELD), and a vacuum fluorescent display (VFD) have been studied and used.

Among them, a liquid crystal panel of the LCD includes a liquid crystal layer, and a TFT substrate and a color filter substrate facing each other with the liquid crystal layer interposed therebetween. The liquid crystal panel can display an image using light provided from a backlight unit.

Recently, researches are actively being carried out to improve an assembling structure of a display device while securing rigidity of the display device.

SUMMARY OF THE INVENTION

In one aspect, there is provided a display device including a display panel, a front cover including a first side wall covering one side of the display panel and a hook provided on an outer surface of the first sidewall, and a back cover fastened to the front cover. The back cover includes a rear wall positioned behind the front cover, a second side wall bent forward from the rear wall and covering the first side wall, and a latching portion which is bent toward inside of the second side wall, and caught by the hook.

The first side wall may include a stopper formed on an outer surface of the first side wall and positioned in front of the hook. The latching portion may be positioned between the stopper and the hook.

A height from the first side wall to the latching portion may be greater than a height from the first side wall to the hook.

The latching portion may be formed by rounding the second side wall of the back cover.

The front cover may include a front wall facing a front surface of the display panel and connected to the first side wall.

The display device may further include a frame positioned behind the display panel. The front cover may include a second rear wall positioned behind the frame and connected to the first side wall.

The front cover may include a hole which penetrates the second rear wall and is adjacent to the first side wall.

The display device may further include a clip including a second latching portion caught by the hook of the first side wall, a fastening portion engaging with the latching portion of the back cover, a first body facing a rear end of the first wall and connected to the second latching portion and the fastening portion, and a second body connected to the first body and inserted into the hole.

The latching portion of the back cover may be formed by rounding the second side wall of the back cover, and the fastening portion may have a curved surface formed along the latching portion.

The second latching portion may be formed as a pair, and the fastening portion may be positioned between the pair of second latching portions.

The second body may be in contact with an inner surface of the first side wall, and the clip may include a third body connected to the second body and having an inclination with respect to the first side wall.

The first side wall may include a stepped portion facing the first body and the second body.

The display device may further include a fixer including a third body fastened to the second rear wall, and a fourth body extending forward from the third body, inserted into the hole, and being in contact with a circumferential surface of the hole.

The display device may further include a fastening member passing through the third body, the second rear wall, and the frame.

The fixer may include a rigid portion bent backward from the third body and forming a space with the second rear wall.

The fixer may include a fifth body extending along the third body from the fourth body.

The fixer may include a sixth body connected to the third body and having an inclination with respect to the third body.

The frame may include a protrusion protruding backward, the third body may be in contact with the frame and include a second hole; and the protrusion may be inserted into the second hole.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
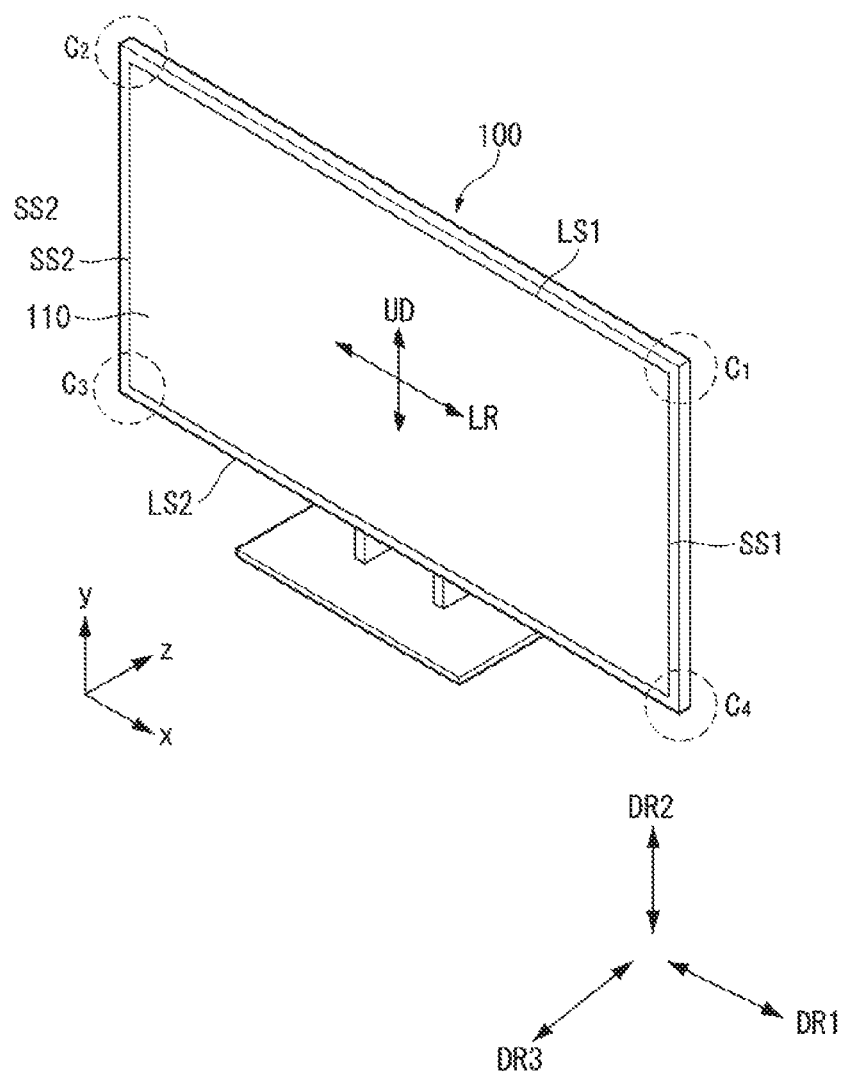
FIGS. 1 to 11 are views illustrating examples of a display device related to the invention.

Reference will now be made in detail embodiments of the invention examples of which are illustrated in the accompanying drawings. Since the invention may be modified in various ways and may have various forms, specific embodiments are illustrated in the drawings and are described in detail in the present specification. However, it should be understood that the invention are not limited to specific disclosed embodiments, but include all modifications, equivalents and substitutes included within the spirit and technical scope of the invention.

The terms 'first', 'second', etc. may be used to describe various components, but the components are not limited by such terms. The terms are used only for the purpose of distinguishing one component from other components. For example, a first component may be designated as a second component without departing from the scope of the invention. In the same manner, the second component may be designated as the first component.

The term "and/or" encompasses both combinations of the plurality of related disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the invention are provided to those skilled in the art in order to describe the invention more completely. Accordingly, shapes and sizes of elements shown in the drawings may be exaggerated for clarity.

A liquid crystal display device (LCD) is hereinafter described as an example of a display panel, but the display panel that may be applied to the present disclosure is not limited to a liquid crystal panel.

Referring to FIG. 1, a display device 100 may include a first long side LS1, a second long side LS2 opposite the first long side LS1, a first short side SS1 neighboring the first long side LS1 and the second long side LS2, and a second short side SS2 opposite the first short side SS1.

The first short side area SS1 may be called a first side area. The second short side area SS2 may be called a second side area opposite the first side area. The first long side area LS1 may be called a third side area that neighbors the first side area and the second side area and that is positioned between the first side area and the second side area. The second long side area LS2 may be called a fourth side area that neighbors the first side area and the second side area, that is positioned between the first side area and the second side area, and that is opposite the third side area.

Furthermore, for convenience of description, a length of the first and the second long sides LS1 and LS2 has been illustrated as belong longer than that of the first and the second short sides SS1 and SS2, but the length of the first and the second long sides LS1 and LS2 may be approximately the same as that of the first and the second short sides SS1 and SS2.

Furthermore, hereinafter, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The first direction DR1 and the third direction DR3 may be collectively referred to as a horizontal direction. Furthermore, the second direction DR2 may be referred to as a vertical direction.

From another aspect, a side of the display device 100 on which an image is displayed may be called a forward direction or a front side or a front surface. When the image is displayed on the display device 100, a side on which the image cannot be viewed may be called a rearward direction or a rear side or a rear surface. When the display device 100 is viewed from the forward direction or the front surface, the first long side LS1 may be called an upper side or an upper surface. In the same manner, the second long side LS2 may be called a lower side or a lower surface. In the same manner, the first short side SS1 may be called a right side or a right surface, and the second short side SS2 may be called a left side or a left surface.

Furthermore, the first long side LS1, the second long side LS2, the first short side SS1, and the second short side SS2 may be referred to as edges of the display device 100. Furthermore, points at which the first long side LS1, the second long side LS2, the first short side SS1, and the second short side SS2 are met may be referred to as corners. For example, a point at which the first long side LS1 and the first short side SS1 are met may be a first corner C1. A point at which the first long side LS1 and the second short side SS2 are met may be a second corner C2. A point at which the second short side SS2 and the second long side LS2 are met may be a third corner C3. A point at which the second long side LS2 and the first short side SS1 are met may be a fourth corner C4.

In this case, a direction from the first short side SS1 to the second short side SS2 or a direction from the second short side SS2 to the first short side SS1 may be called a left-right direction LR. A direction from the first long side LS1 to the second long side LS2 or a direction from the second long side LS2 to the first long side LS1 may be called an up-down direction UD.

Figure 2:
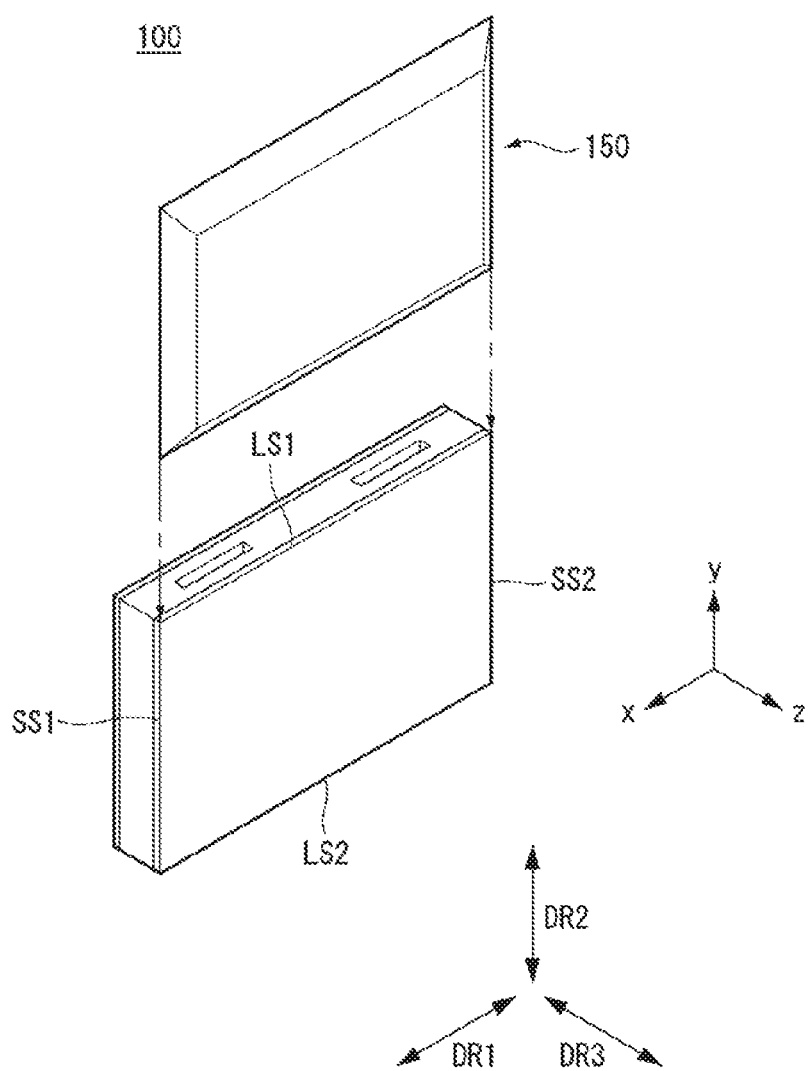

Referring to FIGS. 1 and 2, a back cover 150 may be coupled to a display panel 110. In order for the back cover 150 to be coupled to the display panel 110, the back cover 150 and/or other structures adjacent thereto may include a protrusion, a sliding portion, a coupling portion, and the like.

Figure 3:
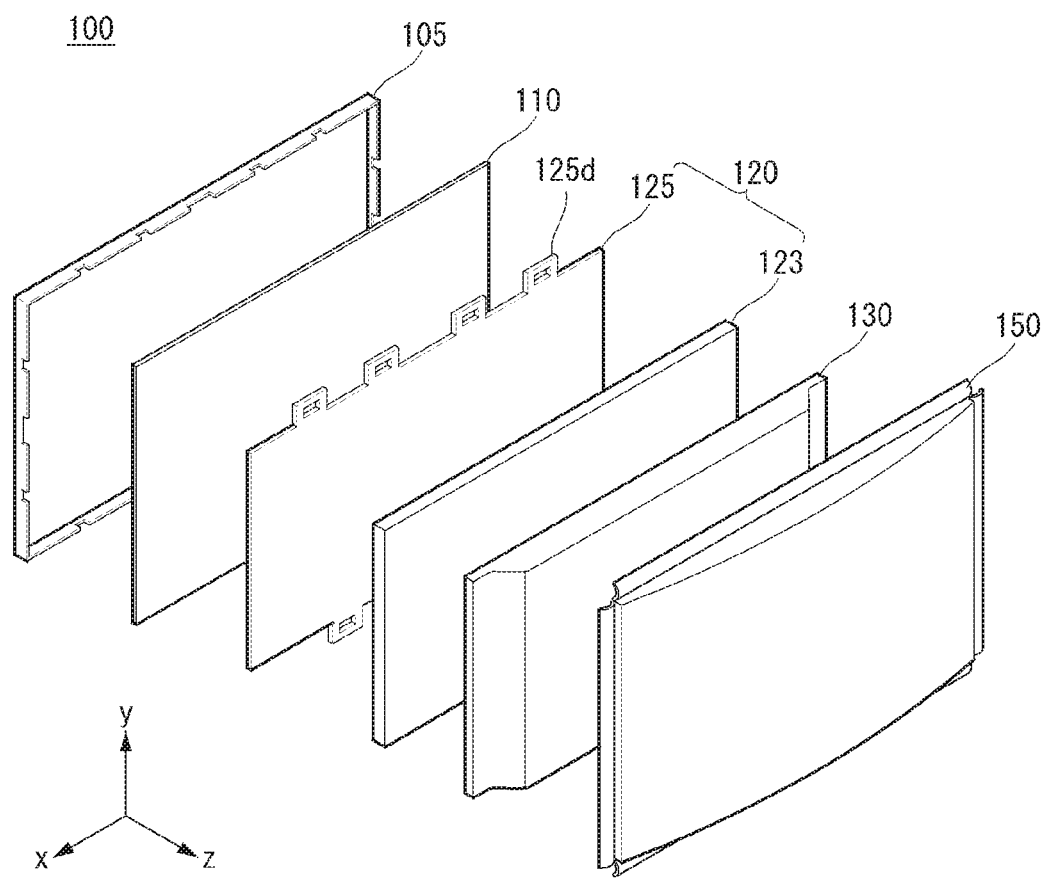

Referring to FIG. 3, a front cover 105 may cover at least a part of a front surface and a side surface of a display panel 110. The front cover 105 may be divided into a front surface cover positioned on the front surface of the display panel 110 and a side surface cover positioned on the side surface of the display panel 110. The front surface cover and the side surface cover may be separately formed. Either the front surface cover or the side surface cover may be omitted.

The display panel 110 is provided on the front surface of the display device 100 and can display an image. The display panel 110 can display the image by outputting red, green or blue (RGB) for each pixel of a plurality of pixels depending on a timing. The display panel 110 may be divided into an active area in which an image is displayed and a de-active area in which an image is not displayed. The display panel 110 may include a front substrate and a rear substrate facing each other with a liquid crystal layer interposed therebetween.

The front substrate may include a plurality of pixels composed of red (R), green (G), and blue (B) sub-pixels. The front substrate can emit light corresponding to the color of red, green, or blue depending on a control signal.

The rear substrate may include switching elements. The rear substrate can switch a pixel electrode. For example, the pixel electrode can change molecular arrangement of the liquid crystal layer depending on a control signal applied from outside. The liquid crystal layer may include liquid crystal molecules. The molecular arrangement of the liquid crystal molecules may be changed corresponding to a voltage difference generated between the pixel electrode and a common electrode. The liquid crystal layer may transmit or block light provided from a backlight unit 120 to the front substrate.

The backlight unit 120 may be positioned behind the display panel 110. The backlight unit 120 may include light sources. The backlight unit 120 may be coupled to a frame 130 in front of the frame 130.

The backlight unit 120 may be driven by a whole driving method or a partial driving method such as local dimming, impulsive or the like. The backlight unit 120 may include an optical sheet 125 and an optical assembly 123.

The optical sheet 125 may transmit light of the light source to the display panel 110 evenly. The optical sheet 125 may be composed of layers. For example, the optical sheet 125 may include a prism sheet, a diffusion sheet, and the like.

The optical sheet 125 may include a coupling portion 125d. The coupling portion 125d may be coupled to the front cover 105, the frame 130, and/or the back cover 150. Alternatively, the coupling portion 125d may be fastened to a structure formed on or coupled to the front cover 105, the frame 130, and/or the back cover 150.

The optical assembly 123 may be positioned behind the optical sheet 125. The optical assembly 123 can provide light to the optical sheet 125. The optical assembly 123 may include a light source that generates light.

The frame 130 may serve to support components of the display device 100. For example, a configuration such as the backlight unit 120 or the like may be coupled to the frame 130. The frame 130 may be made of metal such as aluminum alloy.

The back cover 150 may be positioned on the rear surface or rearward direction of the display device 100. The back cover 150 may be coupled to the frame 130 and/or the front cover 105. For example, the back cover 150 may be an injection-molded resin material.

Figure 4:
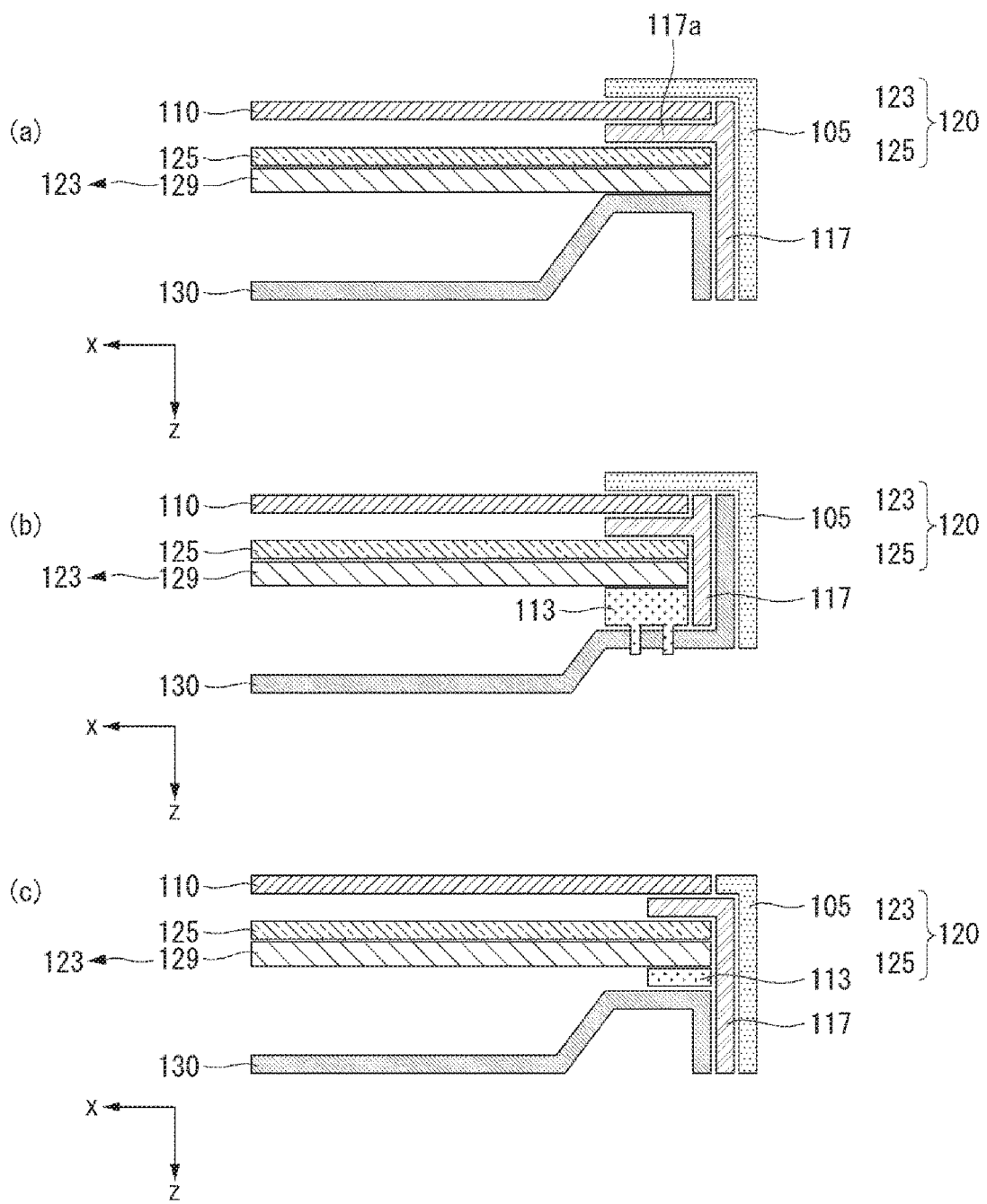

Referring to (a) of FIG. 4, a backlight unit 120 may be positioned in front of a frame 130. The backlight unit 120 may include an optical assembly 123 and an optical sheet 125. The optical assembly 123 may be positioned between the optical sheet 125 and the frame 130. The optical assembly 123 may include a diffusion plate 129.

The optical sheet 125 and/or the diffusion plate 129 may be coupled to the frame 130 at an edge of the frame 130. The optical sheet 125 and/or the diffusion plate 129 may be directly seated on the edge of the frame 130. That is, the optical sheet 125 and/or the diffusion plate 129 may be supported by the frame 130. An edge surface of the optical sheet 125 may be covered by a first guide panel 117. For example, the optical sheet 125 and/or the diffusion plate 129 may be positioned between the edge of the frame 130 and a flange 117a of the first guide panel 117.

A display panel 110 may be positioned in front of the optical sheet 125. An edge of the display panel 110 may be supported by the first guide panel 117. An edge area on a front surface of the display panel 110 may be covered by a front cover 105. For example, it means that a part of the display panel 110 may be positioned between the first guide panel 117 and the front cover 105.

Referring to (b) of FIG. 4, the optical sheet 125 and/or the diffusion plate 129 may be coupled to a second guide panel 113. That is, the second guide panel 113 may be coupled to the frame 130, and the optical sheet 125 and/or the diffusion plate 129 may be coupled to the second guide panel 113. The second guide panel 113 may be made of a different material from the frame 130. The frame 130 may be configured to enclose the first and second guide panels 117 and 113. The first or second guide panel 117 and 113 may be referred to as a holder or a support member.

Referring to (c) FIG. 4, the front cover 105 may not cover the front surface of the display panel 110. That is, one end of the front cover 105 may be positioned on a side of the display panel 110.

Figure 5:
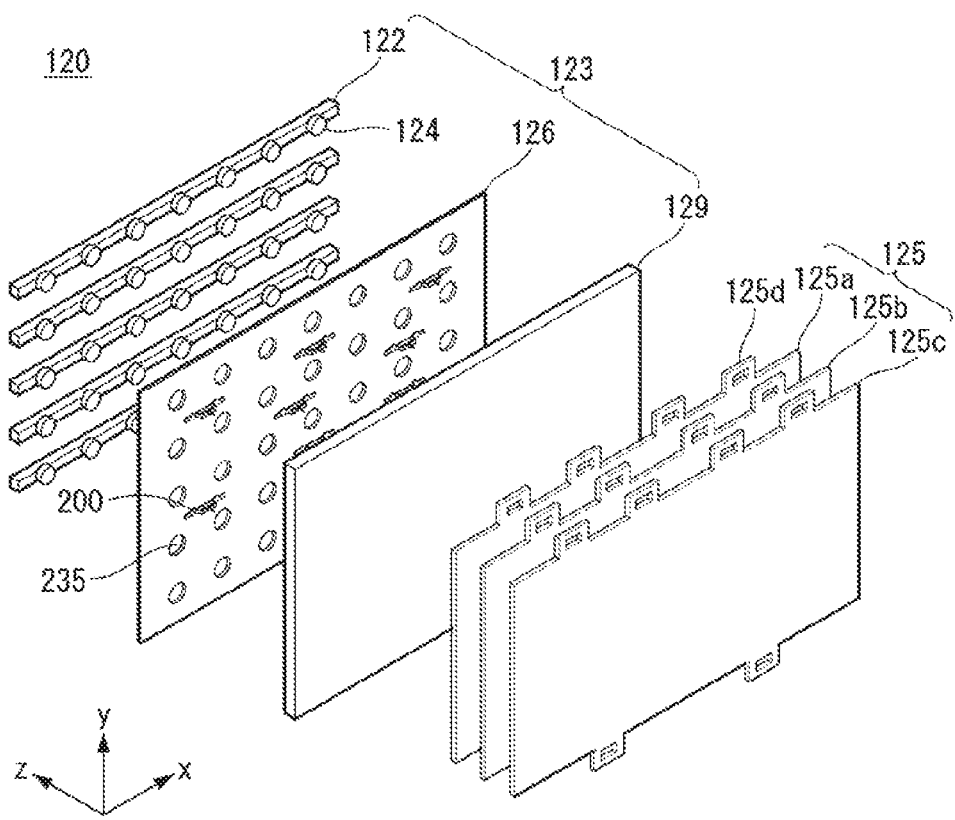

Referring to FIG. 5, a backlight unit 120 may include an optical assembly 123 and an optical sheet 125 positioned on a front side of the optical assembly 123.

The optical assembly 123 may include a substrate 122, at least one light source assembly 124, a reflective sheet 126, and a diffusion plate 129. The optical assembly 123 may not include some of these configurations.

The substrate 122 may be in a form of a plurality of straps extending in a first direction and spaced a predetermined distance apart in a second direction perpendicular to the first direction.

On the substrate 122, the at least one light source assembly 124 may be mounted. An electrode pattern for connecting an adapter and the light source assembly 124 may be formed on the substrate 122. For example, a carbon nanotube electrode pattern for connecting the light source assembly 124 and the adapter may be formed on the substrate 122.

The substrate 122 may be composed of at least one of polyethylene terephthalate (PET), glass, polycarbonate (PC), and silicon. The substrate 122 may be a printed circuit board (PCB) on which the at least one light source assembly 124 is mounted.

The light source assembly 124 may be disposed to be spaced a predetermined distance apart in the first direction on the substrate 122. A diameter of the light source assembly 124 may be greater than a width of the substrate 122. That is, the diameter of the light source assembly 124 may be greater than a length of the substrate 122 in the second direction.

The light source assembly 124 may be a light emitting diode (LED) chip or a light emitting diode package including the at least one light emitting diode chip.

The light source assembly 124 may be composed of a colored LED that emits at least one color among colors such as red, blue, green, and the like or a white LED. The colored LED may include at least one of a red LED, a blue LED, and a green LED.

The reflective sheet 126 may be positioned on a front side of the substrate 122. The reflective sheet 126 may be positioned on an area other than an area where the light source assembly 124 is formed on the substrate 122. The reflective sheet 126 may have a plurality of through holes 235.

The reflective sheet 126 can reflect light emitted from the light source assembly 124 to a front side of the reflective sheet 126. Further, the reflective sheet 126 can reflect light reflected from the diffusion plate 129 again.

The reflective sheet 126 may include at least one of metals and metal oxides which are reflective materials. For example, the reflective sheet 126 may include metals and/or metal oxides having high reflectivity such as at least one of aluminum (Al), silver (Ag), gold (Au), and titanium dioxide (TiO2).

A supporter 200 may be coupled to the reflective sheet 126. The supporter 200 may have a shape protruding forward from the reflective sheet 126. For example, the supporter 200 may be positioned between the reflective sheet 126 and the diffusion plate 129. Otherwise the supporter 200 may be positioned between the reflective sheet 126 and the optical sheet 125. A distance between the reflective sheet 126 and the diffusion plate 129 can be maintained or a distance between the reflective sheet 126 and the optical sheet 125 can be maintained by the supporter 200.

Resin may be deposited on the light source assembly 124 and/or the reflective sheet 126. The resin may serve to diffuse light emitted from the light source assembly 124.

The diffusion plate 129 can diffuse the light emitted from the light source assembly 124. A plurality of light source assemblies 124 may be arranged as a point light source. Light provided forward from the plurality of light source assemblies 124 may have different luminance depending on a distance from the light source assembly 124. The diffusion plate 129 can uniformize illumination profile depending on arrangement of the plurality of light source assemblies 124.

The optical sheet 125 may be positioned in front of the diffusion plate 129. A rear surface of the optical sheet 125 may be in close contact with the diffusion plate 129 and a front surface of the optical sheet 125 may be in close contact with a rear surface of the display panel 110 (see FIG. 1).

The optical sheet 125 may include at least one sheet. In detail, the optical sheet 125 may include one or more prism sheets and/or one or more diffusion sheets. The plurality of sheets included in the optical sheet 125 may be in an adhered state and/or a close contact state.

The optical sheet 125 may be composed of a plurality of sheets having different functions. For example, the optical sheet 125 may include first to third optical sheets 125a to 125c. For example, the first optical sheet 125a may be a diffusion sheet, and the second and third optical sheets 125b and 125c may be prism sheets. The number and/or position of the diffusion sheet and the prism sheet may be changed.

The diffusion sheet 125a can prevent light emitted from the diffusion plate 129 from being partially concentrated, thereby making distribution of the light more uniform. The prism sheets 125b and 125c can collect light emitted from the diffusion sheet 125a to provide the light to the display panel 110.

A coupling portion 125d may be formed on at least one of sides or edges of the optical sheet 125. The coupling portion 125d may be formed on at least one of the first to third optical sheets 125a to 125c.

The coupling portion 125d may be formed at long sides of the optical sheet 125. The coupling portion 125d formed on a first long side and the coupling portion 125d formed on a second long side may be asymmetric. For example, the position and/or number of the coupling portion 125d of the first long side and the coupling portion 125d of the second long side may be different from each other.

Figure 6:
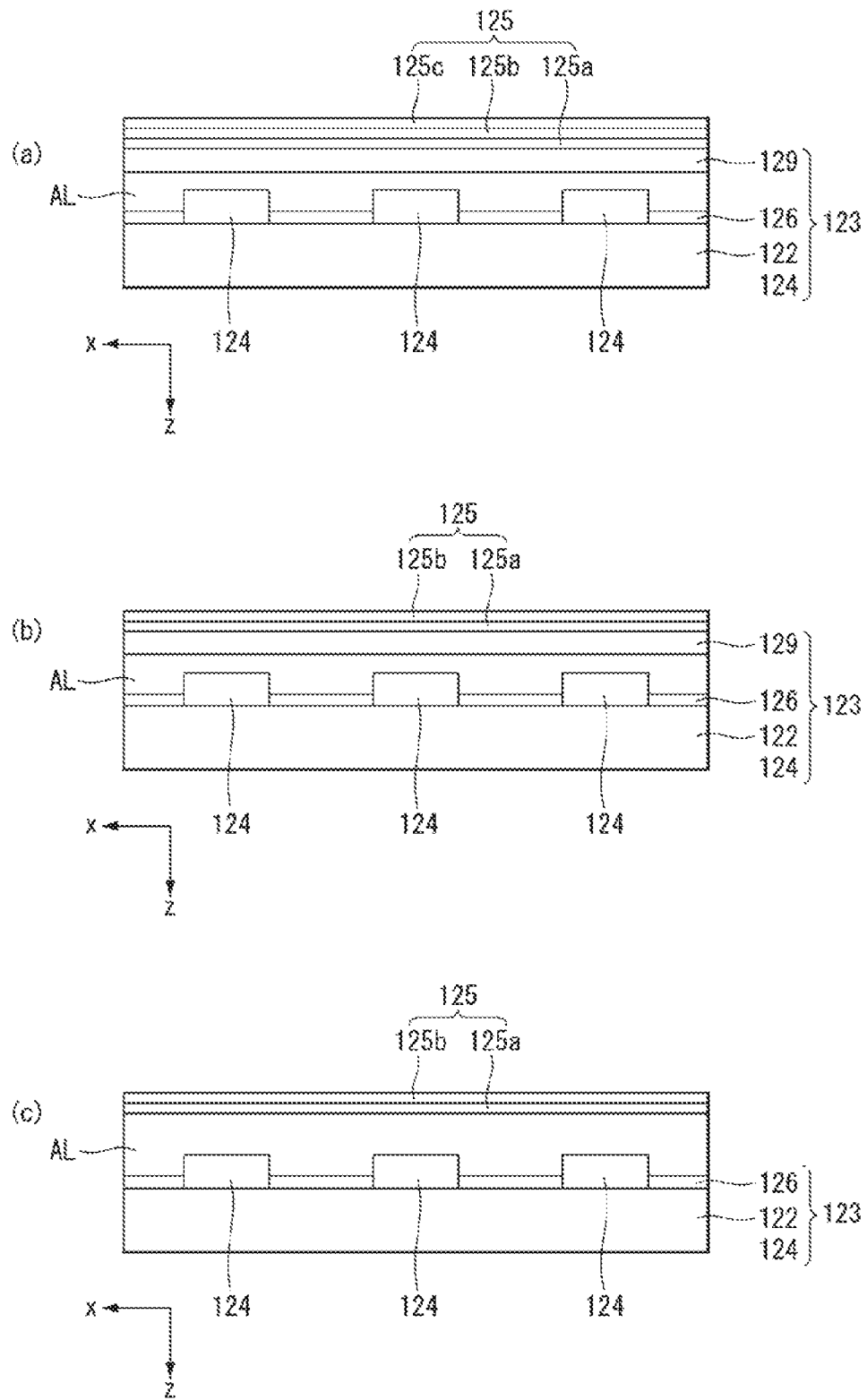

Referring to (a) of FIG. 6, a light source assembly 124 may be disposed on a front surface of a substrate 122. A plurality of light source assemblies 124 may be spaced apart. The plurality of light source assemblies 124 may provide light (or ray) forward.

A reflective sheet 126 may be disposed on the front surface of the substrate 122. The light source assemblies 124 may be disposed between the reflective sheets 126.

A diffusion plate 129 may be positioned in front of the light source assemblies 124. The diffusion plate 129 may be positioned in front of the reflective sheet 126. The diffusion plate 129 may be disposed apart from the light source assemblies 124. The diffusion plate 129 may be disposed apart from the reflective sheet 126.

An air layer AL may be formed between the diffusion plate 129 and the light source assemblies 124. The air layer AL may be formed between the diffusion plate 129 and the reflective sheet 126. The air layer AL may include stable gas. For example, the air layer AL may include gas which is the same as or similar to the composition of the air. For example, the air layer AL may include nitrogen or/and oxygen.

An optical sheet 125 may be disposed on a front surface of the diffusion plate 129. The optical sheet 125 may include first to third optical sheets 125a, 125b, and 125c. The first optical sheet 125a may be positioned on the front surface of the diffusion plate 129. The second optical sheet 125b may be positioned on a front surface of the first optical sheet 125a. The third optical sheet 125c may be positioned on a front surface of the second optical sheet 125b.

Referring to (b) of FIG. 6, an optical sheet 125 may include a first optical sheet 125a and a second optical sheet 125b. The first optical sheet 125a may be a diffusion sheet. The second optical sheet 125b may be a prism sheet.

Referring to (c) of FIG. 6, an optical sheet 125 may be positioned in front of light source assemblies 124. The optical sheet 125 may be positioned in front of a reflective sheet 126. The optical sheet 125 may include a first optical sheet 125a and a second optical sheet 125b. The first optical sheet 125a may be a diffusion sheet. The second optical sheet 125b may be a prism sheet.

An air layer AL may be formed between the optical sheet 125 and the reflective sheet 126. The air layer AL may be formed between the optical sheet 125 and the light source assemblies 124.

Figure 7:
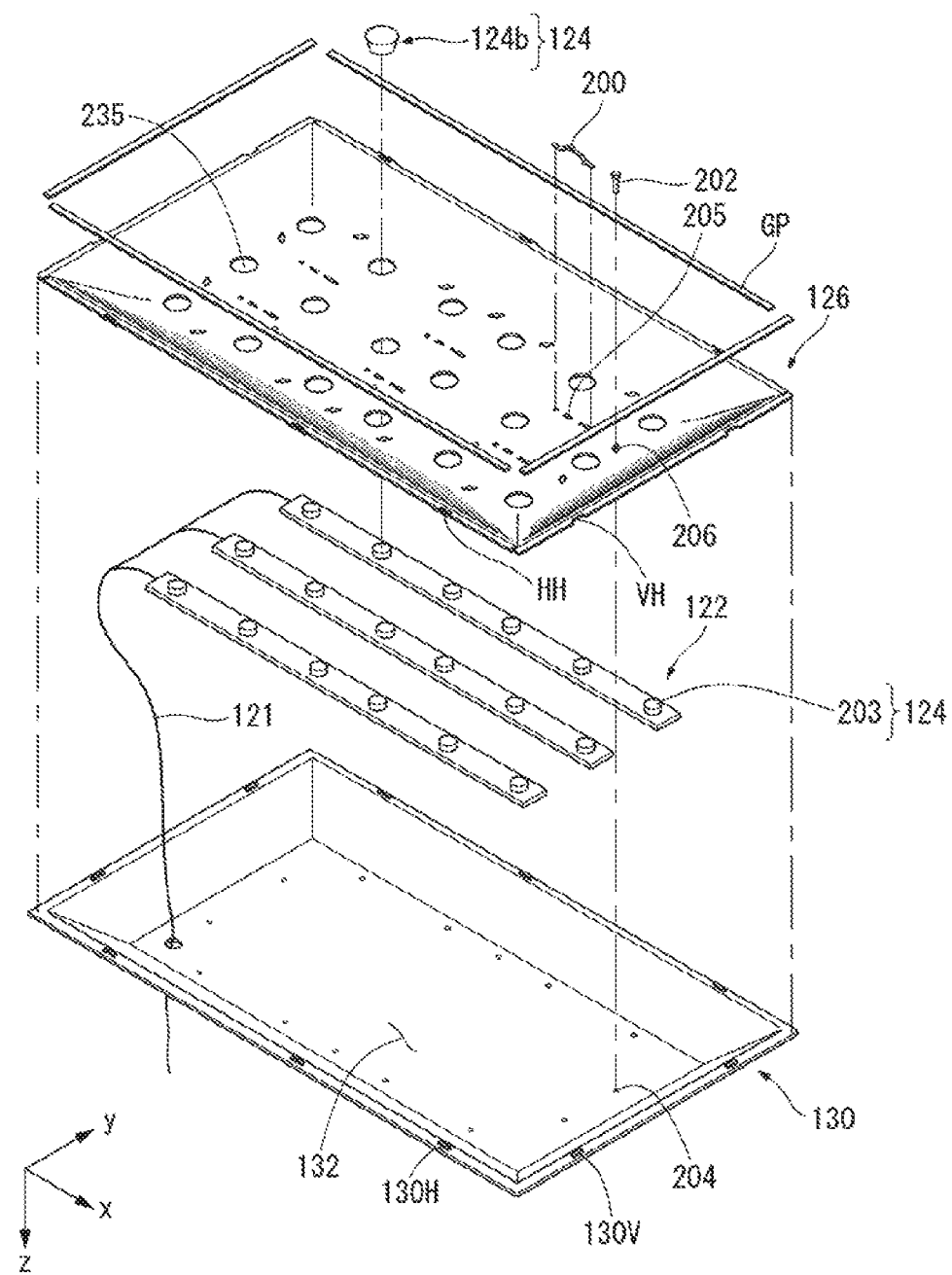

Referring to FIG. 7, a reflective sheet 126 may be coupled to a frame 130. For example, the reflective sheet 126 may be coupled to a seating portion 132 formed on inside of the frame 130. The reflective sheet 126 may have a three-dimensional shape corresponding to a shape of the seating portion 132.

The reflective sheet 126 may include a horizontal coupling portion HH and/or a vertical coupling portion The horizontal coupling portion HH and/or the vertical coupling portion VH may have a shape of an opening formed along sides of the reflective sheet 126.

The horizontal coupling portion HH may be an opening formed along two opposite sides of the reflective sheet 126. For example, the horizontal coupling portion may be an opening formed along long sides of the reflective sheet 126.

The vertical coupling portion VH may be an opening formed along two opposite sides of the reflective sheet 126. For example, the vertical coupling portion VH may be an opening formed along short sides of the reflective sheet 126.

The frame 130 may include a horizontal protrusion 130H and a vertical protrusion 130V. The horizontal protrusion 130H or the vertical protrusion 130V may be formed along two opposite sides of the frame 130. For example, the horizontal protrusion 130H may be formed along long sides of the frame 130. For example, the vertical protrusion 130V may be formed along short sides of the frame 130.

The horizontal protrusion 130H or the vertical protrusion 130V may protrude forward. The horizontal protrusion 130H or the vertical protrusion 130V may be coupled to the reflective sheet 126. For example, the horizontal protrusion 130H may be coupled to the horizontal coupling portion HH of the reflective sheet 126. For example, the vertical protrusion 130V may be coupled to the vertical coupling portion VH of the reflective sheet 126.

A guide panel GP may include an elongated rod shape. The guide panel GP may be disposed on a front surface of the reflective sheet 126. The guide panel GP may be disposed along edges of the reflective sheet 126. The guide panel GP may be formed of a combination of elongated rods.

The guide panel GP may include plastic. The guide panel GP may be formed by injection. The guide panel GP may include metal. The guide panel GP may be formed by press working.

A substrate 122 may be positioned between the frame 130 and the reflective sheet 126. A light source assembly 124 may be disposed on a front surface of the substrate 122. The light source assembly 124 may be positioned in a lens hole 235 formed in the reflective sheet 126.

A plurality of substrates 122 may be arranged in a horizontal direction and/or a vertical direction. The substrates 122 may be electrically connected to a signal line 121. The substrate 122 may be provided with power and/or electrical signals from the signal line 121.

The lens hole 235 formed in the reflective sheet 126 may be formed corresponding to a light source 203 disposed on the substrate 122. The light source 203 may be positioned in the lens hole 235. The light source 203 and a part of the substrate 122 may be exposed forward through the lens hole 235. A lens 124b may be positioned in front of the light source 203. The lens 124b may be coupled to a part of the substrate 122 exposed frontward through the lens hole 235.

The reflective sheet 126 may form a supporter hole 205. A supporter 200 may be coupled to the supporter hole 205. The supporter 200 may support the diffusion plate 129 (see FIG. 5) and/or the optical sheet 125 (see FIG. 5) positioned in front of the reflective sheet 126. By the supporter 200, the reflective sheet 126 can be spaced apart the diffusion plate 129 (see FIG. 5) and/or the optical sheet 125 (see FIG. 5).

The reflective sheet 126 may form a plurality of fixing pin holes 206. A fixing pin 202 may be coupled to the fixing pin hole 206. The fixing pin 202 may be coupled to a frame hole 204 formed in the frame 130. The fixing pin 202 can fasten the reflective sheet 126 to the frame 130.

Figure 8:
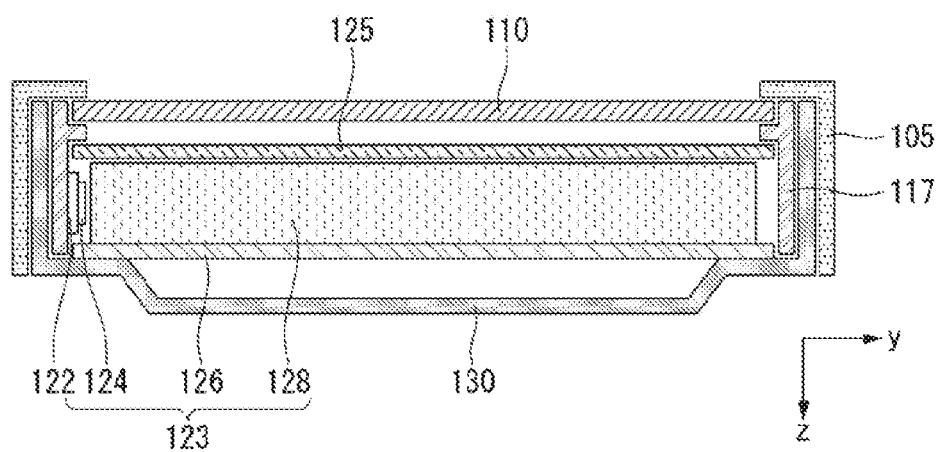

Referring to FIG. 8, an optical assembly 123 may include a substrate 122, a reflective sheet 126, a light source assembly 124, and a light guide plate 128.

The optical assembly 123 may be positioned in front of a frame 130. For example, the optical assembly 123 may be positioned between the frame 130 and an optical sheet 125. The optical assembly 123 may be supported by the frame 130.

The substrate 122 may be positioned inside the frame 130. The substrate 122 may be coupled to a first guide panel 117. The substrate 122 may be directly coupled to the first guide panel 117. For example, the substrate 122 may be configured to be coupled to at least one of the first guide panel 117, the frame 130, and a front cover 105.

The substrate 122 may be positioned to be adjacent to a side of the reflective sheet 126 and/or the light guide plate 128. That is, it means that a front surface of the substrate 122 may be directed to the optical assembly 123. The substrate 122 may be spaced apart from the reflective sheet 126 and/or the light guide plate 128 by a predetermined distance.

Figure 9:
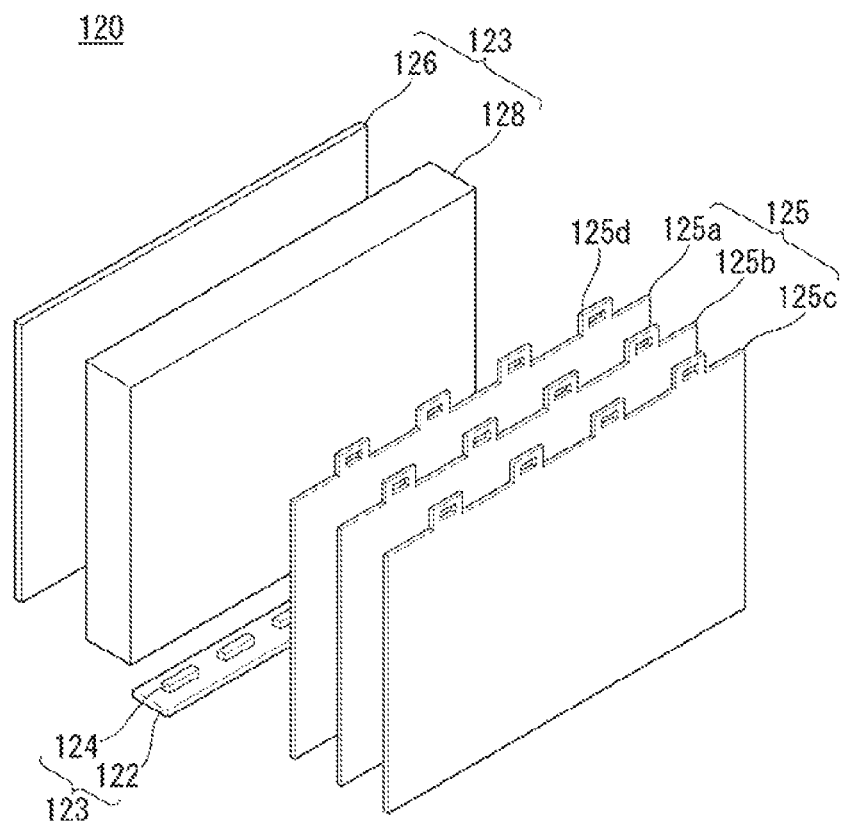

Referring to FIG. 9, a backlight unit 120 may include an optical assembly 123 including a substrate 122, at least one light source assembly 124, a reflective sheet 126 and a light guide plate 128, and an optical sheet 125 positioned on a front side of the optical assembly 123.

The substrate 122 may be positioned on one side of the optical assembly 123. The substrate 122 may extend in a longitudinal direction of the optical assembly 123. The light source assembly 124 may be disposed on the substrate 122 with predetermined spacing. Most of light emitted from the light source assembly 124 can be transmitted into the light guide plate 128.

The reflective sheet 126 may be positioned behind the light guide plate 128. The reflective sheet 126 can reflect light, which is emitted from the light source assembly 124 and is reflected by the light guide plate 128 and directed toward the reflective sheet 126, toward the front of the light guide plate 128.

The reflective sheet 126 may include at least one of metals and metal oxides which are reflective materials. For example, the reflective sheet 126 may include metals and/or metal oxides having high reflectivity such as at least one of aluminum (Al), silver (Ag), gold (Au), and titanium dioxide ($TiO_2$).

The reflective sheet 126 may be formed by depositing and/or coating metals or metal oxides. The reflective sheet 126 may be printed with an ink including metal materials. The reflective sheet 126 may be formed with a vapor deposition layer formed using a vacuum deposition method such as a thermal deposition method, an evaporation method, or a sputtering method. The reflective sheet 126 may be formed with a coating layer and/or a printing layer formed using a printing method, a gravure coating method, or a silk screen method.

The optical sheet 125 may include one or more prism sheets and/or one or more diffusion sheets. The plurality of sheets included in the optical sheet 125 may be in an adhered state and/or a close contact state.

The optical sheet 125 may be composed of a plurality of sheets having different functions. For example, the optical sheet 125 may include first to third optical sheets 125a to 125c. The first optical sheet 125a may be a diffusion sheet, and the second and third optical sheets 125b and 125c may be prism sheets. The number and/or position of the diffusion sheet and the prism sheet may be changed.

The diffusion sheet 125a can prevent light emitted from the light guide plate 128 from being partially concentrated, thereby making luminance of the light more uniform. The prism sheets 125b and 125c can collect light emitted from the diffusion sheet 125a and allow the light to be vertically incident on the display panel 110.

A coupling portion 125d may be formed on at least one of edges of the optical sheet 125. The coupling portion 125d may be formed on at least one of the first to third optical sheets 125a to 125c.

The coupling portion 125d may be formed at long side edges of the optical sheet 125. The coupling portion 125d formed on a first long side and the coupling portion 125d formed on a second long side may be asymmetric. For example, the position and/or number of the coupling portion 125d of the first long side and the coupling portion 125d of the second long side may be different from each other.

Figure 10:
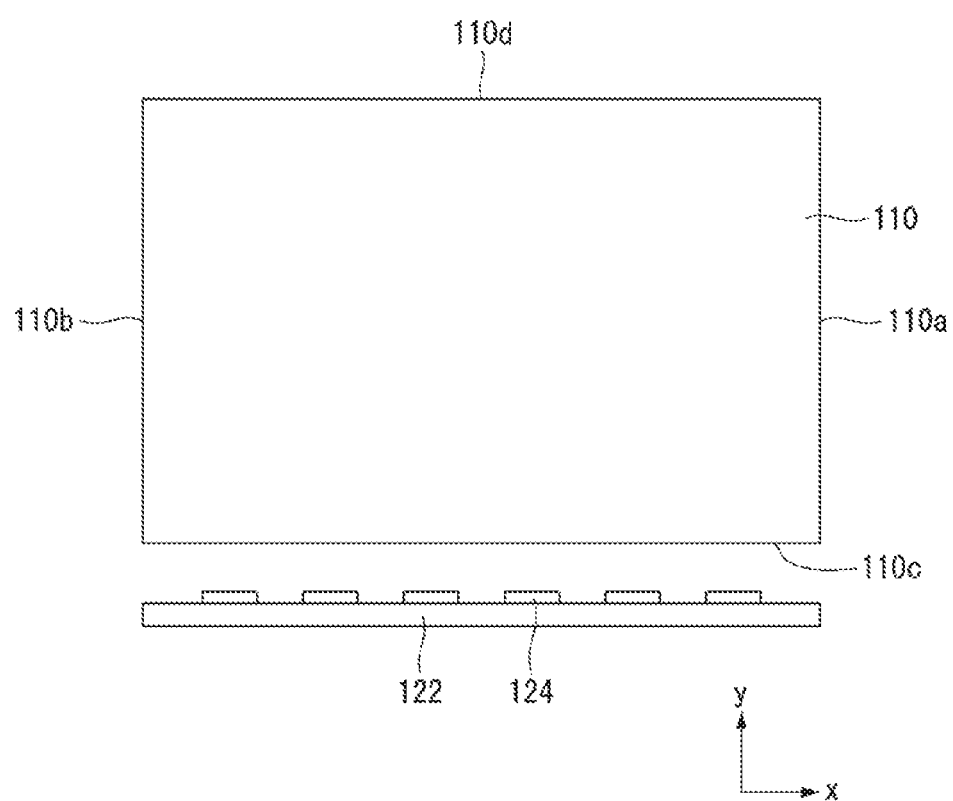

Referring to FIG. 10, the light source assembly 124 may emit light from a lower side 110c to an upper side 110d of the display panel 110. That is, the light emitted from the light source assembly 124 is diffused from the lower side 110c to the upper side 110d of the display panel 110 by the light guide plate 128 to provide the light to the entire display panel 110.

Figure 11:
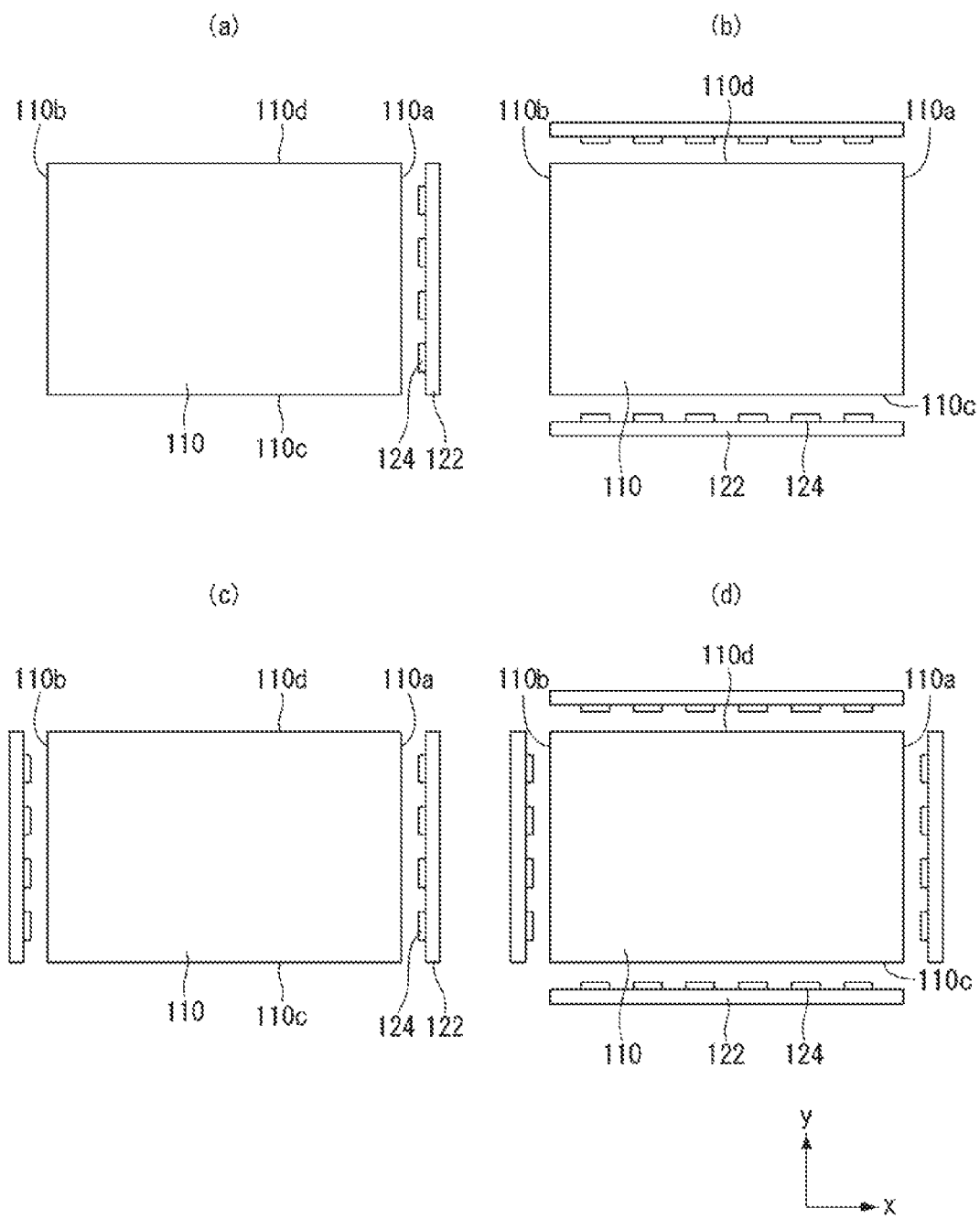

Referring to (a) of FIG. 11, the light source assembly 124 may be positioned on the right side 110a of the display panel 110. However, the present disclosure is not limited thereto, and the light source assembly 124 may be positioned on the left side 110b of the display panel 110.

Referring to (b) of FIG. 11, the light source assembly 124 may be positioned on the lower side 110c and the upper side 110d of the display panel 110. In addition, referring to (c) of FIG. 11, the light source assembly 124 may be positioned on the right side 110a and the left side 110b of the display panel 110. Moreover, referring to (d) of FIG. 11, the light assembly may be positioned on the right side 110a, the left side 110b, the lower side 110c, and the upper side 110d of the display panel.

Figure 12:
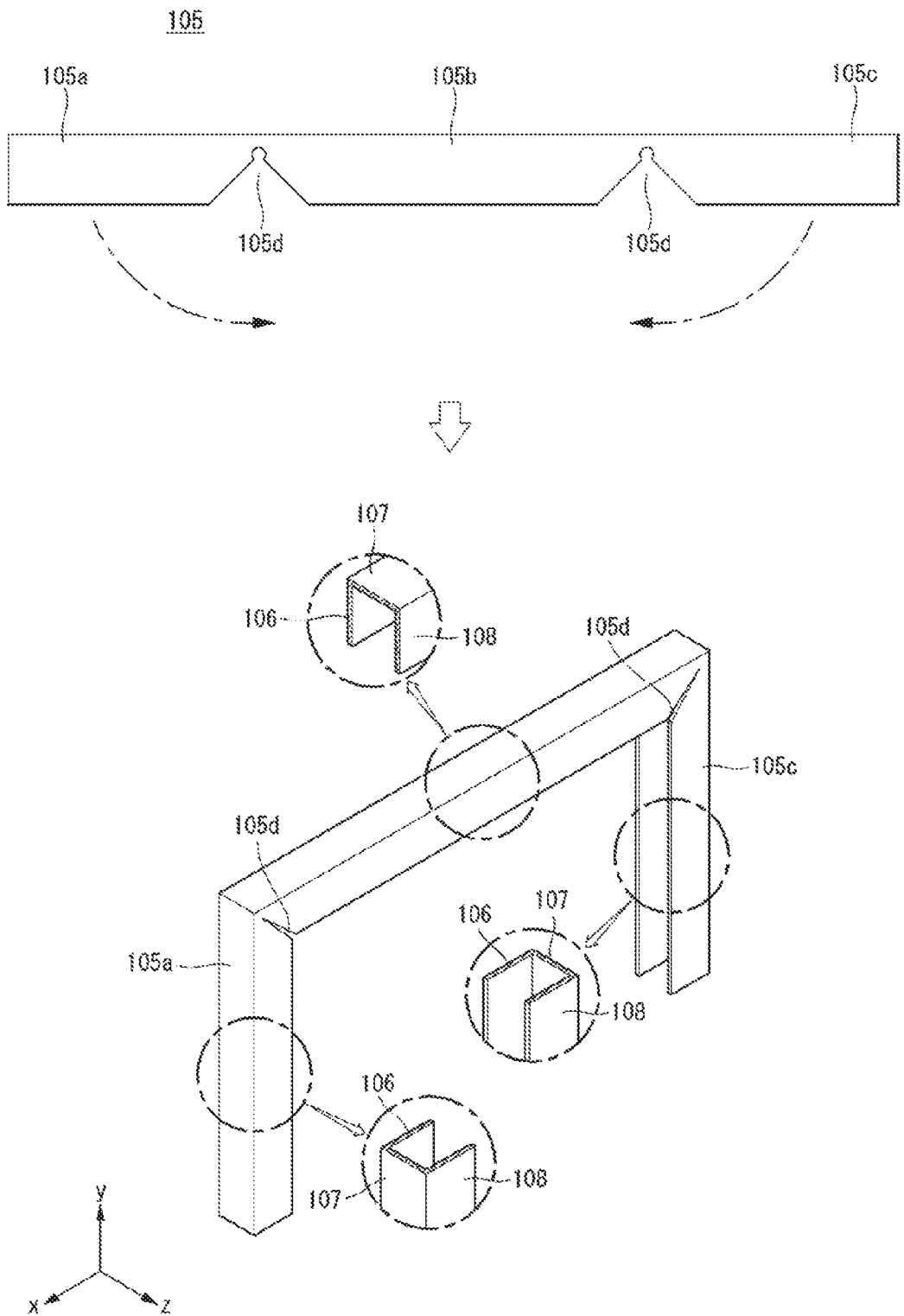
FIGS. 12 to 28 are views illustrating examples of configuration of a display device according to an embodiment of the invention.

Referring to FIG. 12, a front cover 105 may be formed by bending an elongated metal member. The metal member may include a first part 105a, a second part 105b, and a third part 105c which are sequentially disposed along a longitudinal direction. The first part 105a, the second part 105b and the third part 105c can be distinguished from each other by a gap 105d.

The first part 105a may form a first short side of the display device. The second part 105b may form a first long side of the display device. The third part 105c may form a third short side of the display device.

The gap 105d may be positioned to be adjacent to a corner formed by the first part 105a and the second part 105b. The gap 105d may be positioned to be adjacent to a corner formed by the second part 105b and the third part 105c.

The front cover 105 may include a front wall 106, a side wall 107, and a rear wall 108. The front wall 106 and the rear wall 108 may face each other. The side wall 107 may connect the front wall 106 and the rear wall 108.

A cross section perpendicular to a longitudinal direction of the first part 105a may be the same as a cross section perpendicular to a longitudinal direction of the second part 105b. The cross section perpendicular to the longitudinal direction of the second part 105b may be the same as a cross section perpendicular to a longitudinal direction of the third part 105c. The cross section perpendicular to the longitudinal direction of the third part 105c may be the same as the cross section perpendicular to the longitudinal direction of the first part 105a.

A part of at least one of the display panel, the guide panel, the backlight unit, and the main frame may be positioned between the front wall 106 and the rear wall 108.

Figure 13:
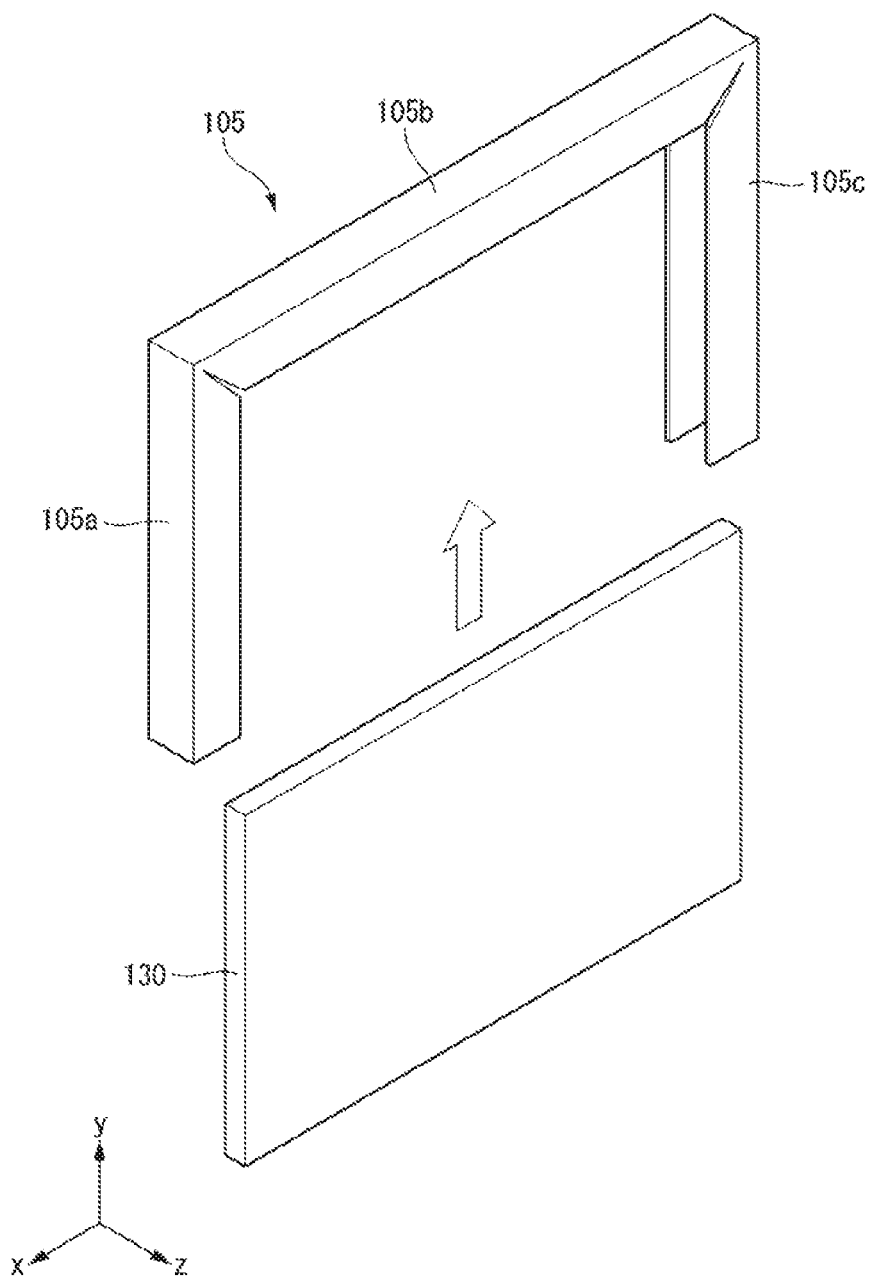

Referring to FIG. 13, the first part 105a and the third part 105c may extend in the left-right direction with respect to the second part 105b. A main frame 130 may be inserted into a space formed by the front cover 105. In this instance, the main frame 130 may be coupled to at least one of the display panel, the guide panel, and the backlight unit.

Figure 14:
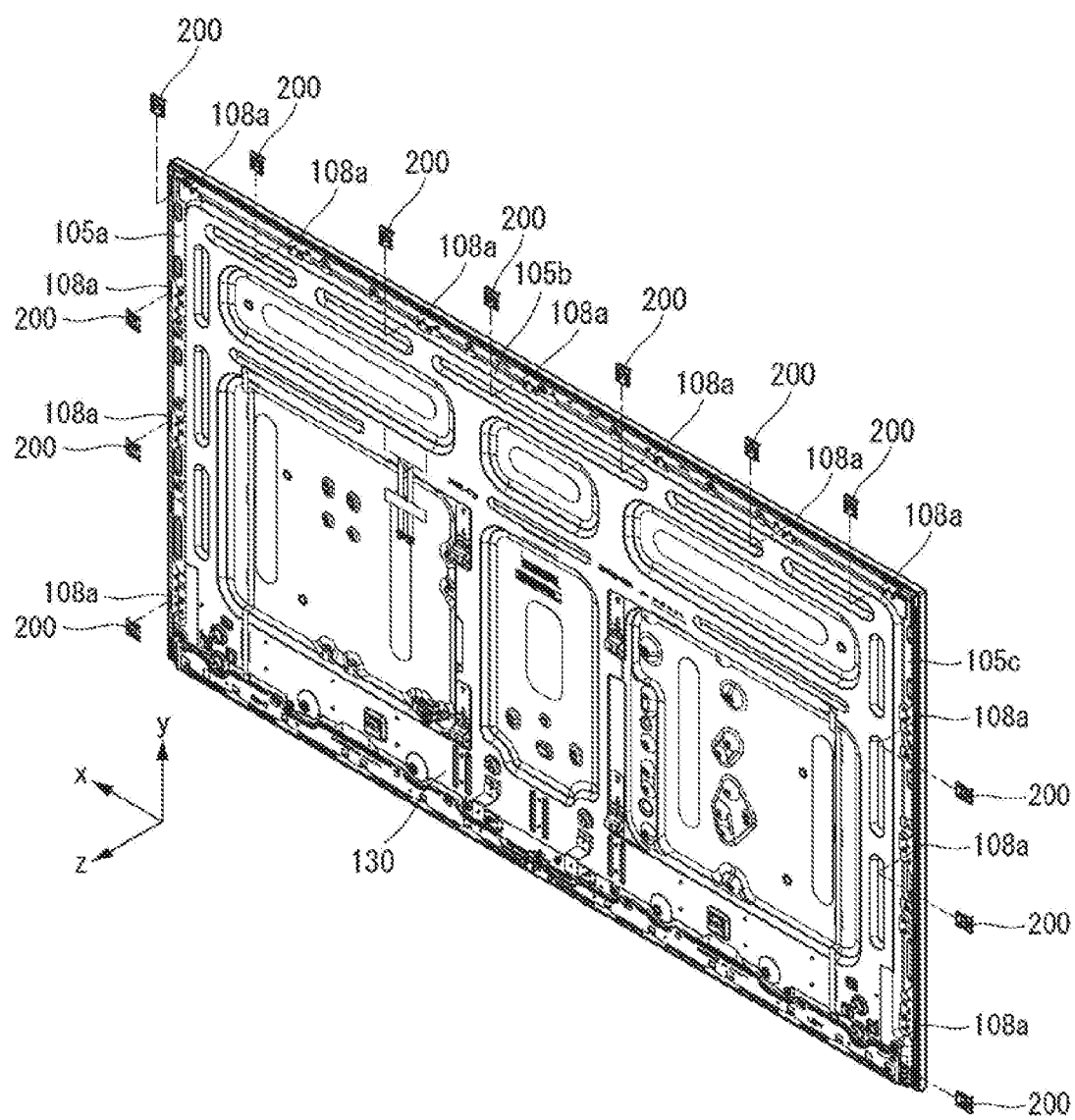

Referring to FIG. 14, the rear wall 108 may include a hole 108a. The hole 108a may be formed in plural along a longitudinal direction of the rear wall 108 of the first part 105a. The hole 108a may be formed in plural along a longitudinal direction of the rear wall 108 of the second part 105b. The hole 108a may be formed in plural along a longitudinal direction of the rear wall 108 of the third part 105c. The hole 108a formed in the first part 105a may be a long hole in the longitudinal direction of the first part 105a. The hole 108a formed in the second part 105b may be a long hole in the longitudinal direction of the second part 105b. The hole 108a formed in the third part 105c may be a long hole in the longitudinal direction of the third part 105c.

A fixer 200 may be inserted into each hole 108a. The fixer 200 may be fastened to a main frame 130 through a fastening member S. The fixer 200 may be fastened to the rear wall 108 through the fastening member S.

Figure 15:
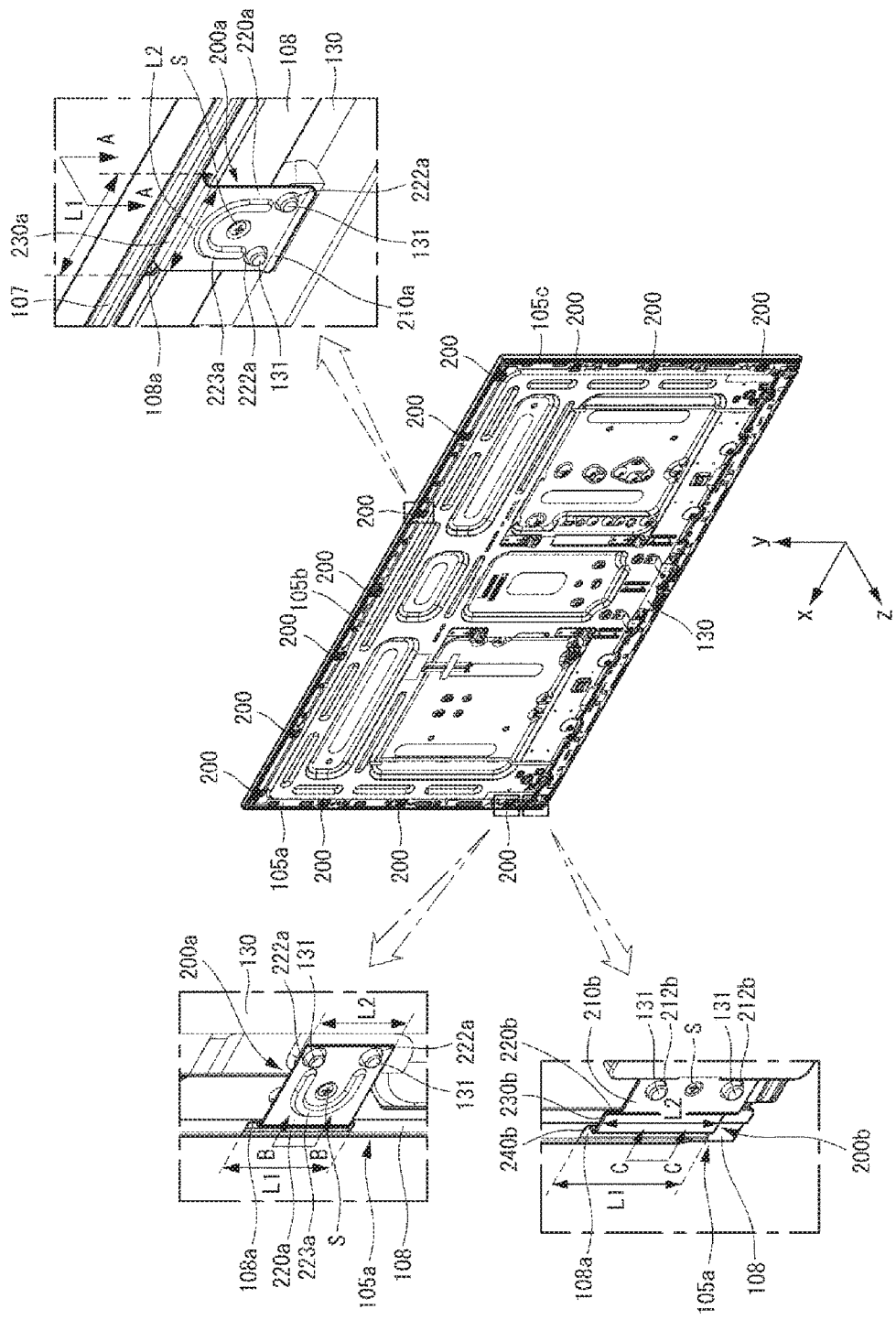
Figure 16:
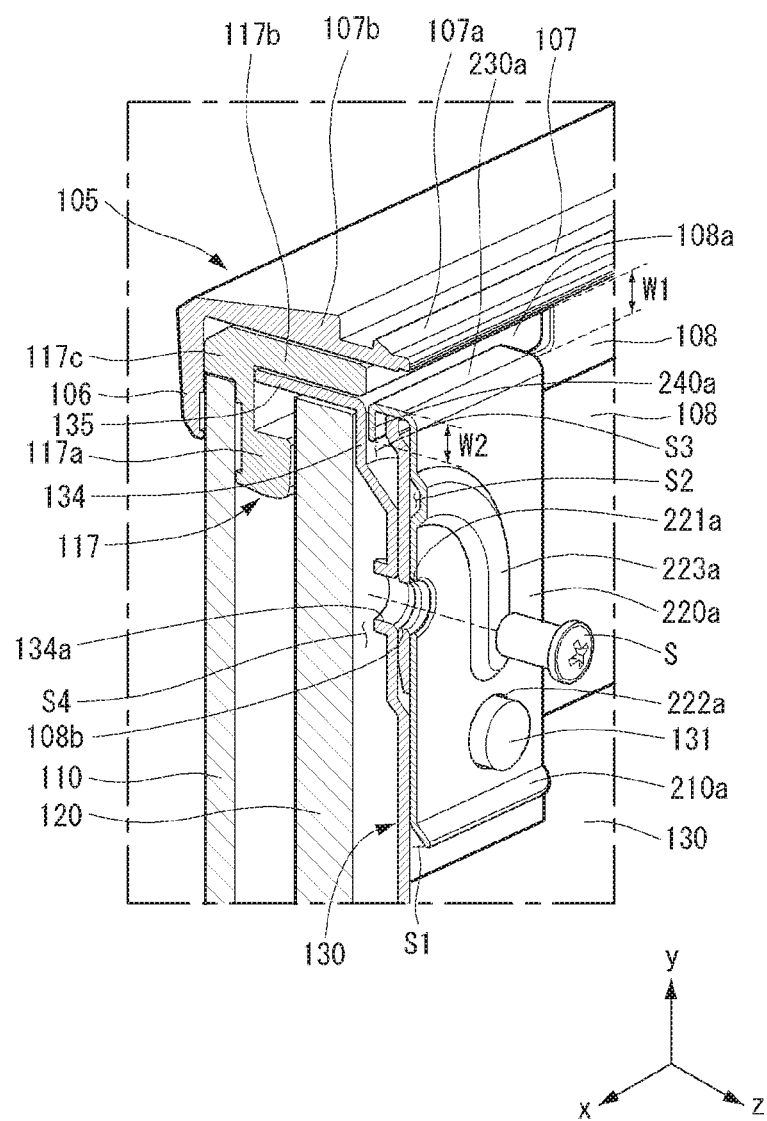
Figure 17:
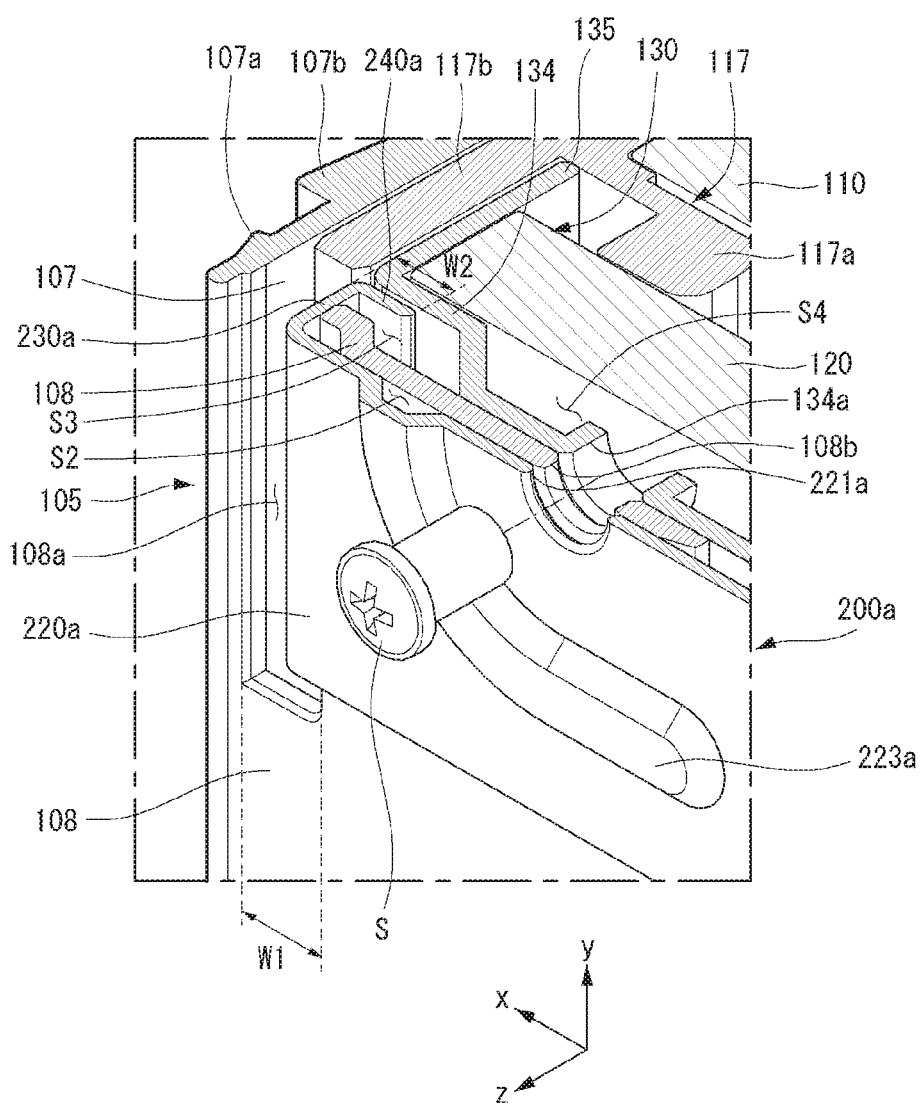

Referring to FIG. 15, FIG. 16 and FIG. 17, the fixer 200 may fix the front cover 105 to the main frame 130. The fixer 200 may be used as a generic term for a first fixer 200a and a second fixer 200b. The second fixer 200b may be positioned at the bottom among the fixers 200 to be inserted into the first part 105a of the front cover 105. The second fixer 200b may be positioned at the bottom among the fixers 200 to be inserted into the third part 105c of the front cover 105. The first fixer 200a may be referred to as a remaining fixer 200 other than the second fixer 200b among the fixers 200 to be inserted into the front cover 105.

The side wall 107 may include a stopper 107b. The side wall 107 may include a hook 107a. The hook 107a may be referred to as the protrusion 107a, coupling protrusion 107a or threshold 107a. The hook 107a may be positioned behind the stopper 107b.

The display panel may be seated in a panel seating portion 117a. A connecting portion 117c can connect a side wall 117b and the panel seating portion 117a. A side wall 135 of the main frame 130 may be positioned between the side wall 117b of a guide panel 117 and the panel seating portion 117a.

The display panel 110 may be positioned between a front wall 106 and the panel seating portion 117a. A backlight unit 120 may be positioned between the panel seating portion 117a and a rear wall 134 of the main frame 130. The side wall 117b of the guide panel 117 may be positioned between the side wall 107 of the front cover 105 and the side wall 135 of the main frame 130.

A first body 210a may be positioned to have an inclination with respect to the rear wall 134 of the main frame 130. A space S1 may be formed between the first body 210a and the rear wall 134 of the main frame 130. The first fixer 200a can be easily separated from the main frame 130 or the front cover 105 due to the first body 210a.

A second body 220a may be in contact with the rear wall 134 of the main frame 130. The second body 220a may include a hole 221a. The hole 221a may face a hole 108b of the front cover 105 and a hole 134a of the main frame 130. The second body 220a may include a rigid portion 223a. The rigid portion 223a may form a space S2. The rigid portion 223a can increase rigidity of the second body 220a. The main frame 130 may include a protrusion 131 protruding backward. The protrusion 131 may be inserted into a hole 222a of the second body 220a. The protrusion 131 can fix position of the second body 220a.

A fastening member S may pass through the hole 221a of the second body 220a, the hole 108b of the front cover 105, and the hole 134a of the main frame 130. The fastening member S may fix the front cover 105 and the first fixer 200a to the main frame 130. A space S4 may be formed between the rear wall 134 and the backlight unit 120. A part of the fastening member S may be positioned in the space S4.

A third body 230a may extend forward from the second body 220a. The third body 230a may be inserted into the hole 108a. The third body 230a can press the rear wall 108 downward.

A fourth body 240a may extend downward from the third body 230a. The fourth body 240a may be positioned in a space S3 formed by the rear wall 134 of the main frame 130 and the rear wall 108 of the front cover 105.

A length L1 of the hole 108a may be longer than a width L2 of the second body 220a, A width W1 of the hole 108a may be longer than a length W2 of the fourth body 240a.

Figure 18:
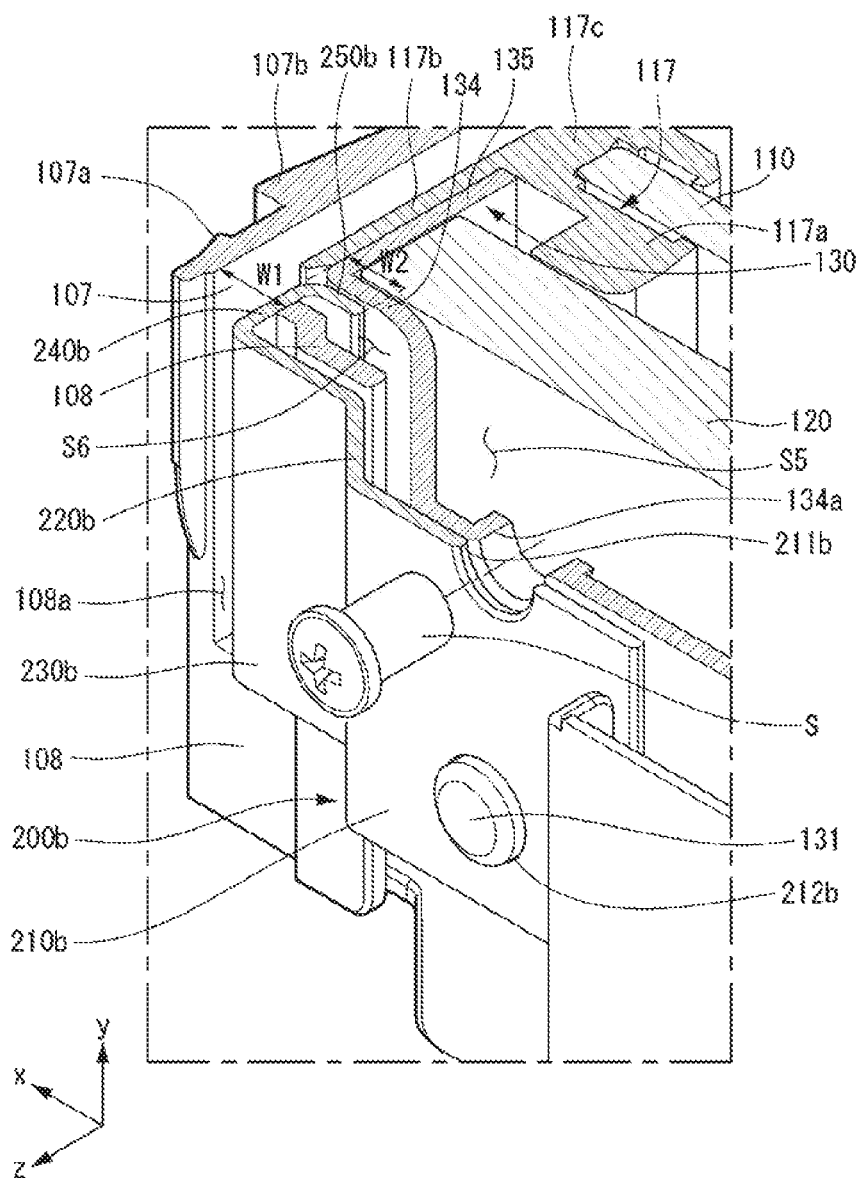

Referring to FIGS. 15 and 18, a first body 210b may be in contact with a rear wall 134 of a main frame 130. The first body 210b may include a hole 211b. The hole 211b may face a hole 108b of a front cover 105 and a hole 134a of the main frame 130. The main frame 130 may include a protrusion 131 protruding backward. The protrusion 131 may be inserted into a hole 212b of the first body 210b. The protrusion 131 can fix position of the first body 210b.

A fastening member S may pass through the hole 211b of the first body 210b, the hole 108b of the front cover 105 and the hole 134a of the main frame 130. The fastening member S can fix the front cover 105 and a second fixer 200b to the main frame 130. A space S5 may be formed between the rear 134 and a backlight unit 120. A part of the fastening member S may be positioned in the space S5. A power supply device or a control device may be positioned in the space S5.

A second body 220b may be bent forward from the first body 210b. A third body 230b may face a rear wall 108. A fourth body 240b may extend forward from the third body 230b. The fourth body 240b may be inserted into a hole 108a. The fourth body 240b can press the rear wall 108 to the left (−x-axis direction).

A fifth body 250b may extend to the left (−x-axis direction) from the fourth body 240b. The fifth body 250b may be positioned in a space S6 formed by the rear wall 134 of the main frame 130 and the rear wall 108 of the front cover 105.

A length L1 of the hole 108a may be longer than a width L2 of the third body 230b. A width W1 of the hole 108a may be longer than a length W2 of the fifth body 250b.

Figure 19:
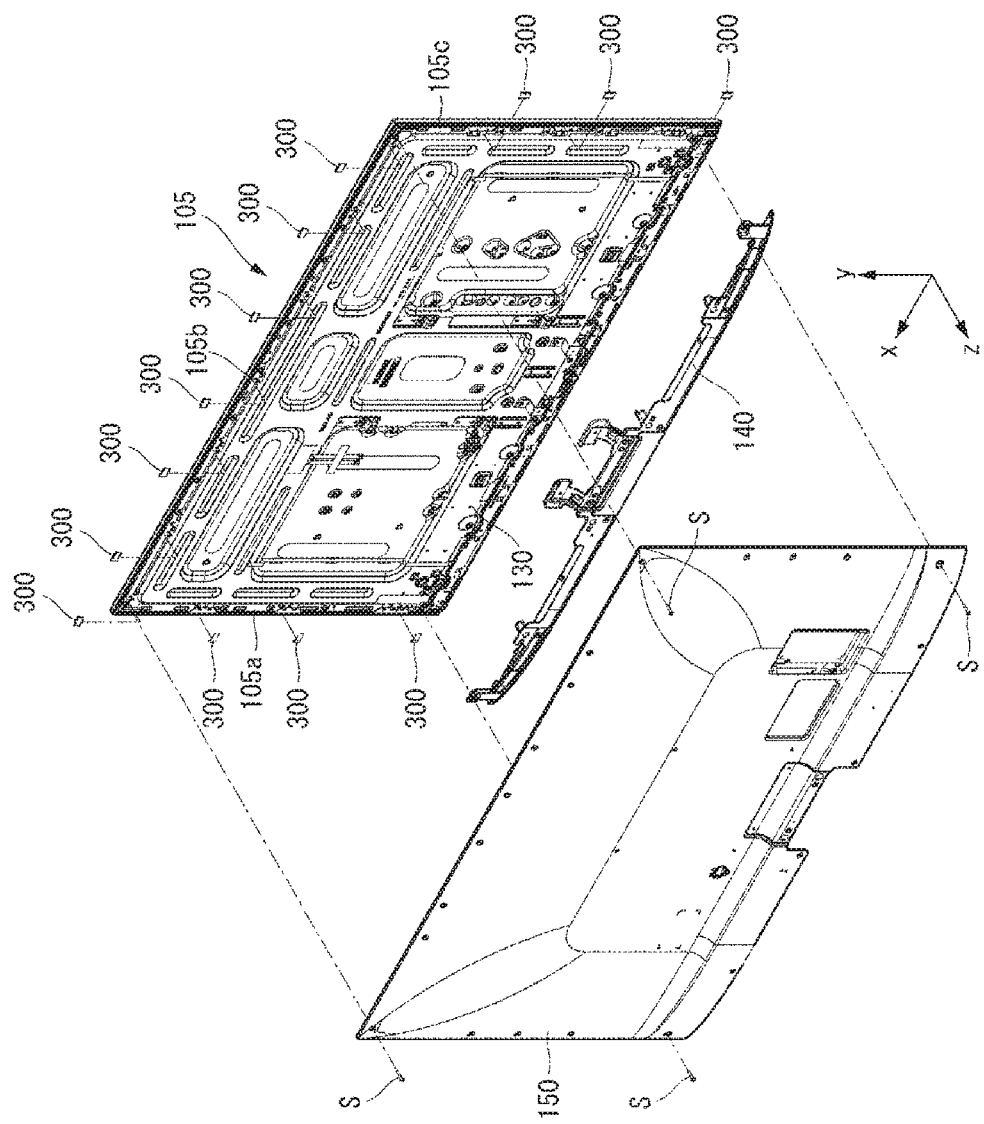

Referring to FIG. 19, a clip 300 may be inserted into each hole 108a. The clip 300 may be fastened to a side wall 107. The clip 300 may be fixed to the side wall 107.

A bottom frame 140 may be fastened to a main frame 130. The bottom frame 140 may be positioned to be adjacent to a second long side of the display device. The bottom frame 140 may be fastened to a first part 105a. The bottom frame 140 may be fastened to a third part 105c. The bottom frame 140 may connect the first part 105a and the third part 105c.

A back cover 150 may be fastened to a front cover 105 through the clip 300. The back cover 150 may be fastened to the main frame 130 through a fastening member S. The bottom frame 140 may be positioned between the back cover 150 and the main frame 130.

Referring to FIGS. 20, 21, 22 and 23, a clip 300a may be fastened to a side wall 107. A latching portion 310a may be caught by a hook 107a. A first part 313a may be positioned in front of the hook 107a. A second part 312a may be connected to the first part 313a. The second part 312a may extend along the hook 107a. A third part 311a may be connected to the second part 312a. The third part 311a may extend along the side wall 107.

A first body 330a may be connected to the third part 311a. The first body 330a may be in contact with a rear end of the side wall 107.

A second body 340a may be connected to the first body 330a. The second body 340a may be inserted into a hole 108a. The second body 340a may be positioned in a space S3.

A third body 350a may be connected to the second body 340a. The third body 350a may have an inclination with respect to the side wall 107. A space S7 may be formed between the third body 350a and the side wall 107. The clip 300a can be easily separated from a front cover 105 due to the third body 350a.

A stepped portion 107d may be formed in the side wall 107. The clip 300a can be easily separated from the front cover 105 due to the stepped portion 107d.

The latching portion 310a may be formed as a pair. A fastening portion 320a may be formed between the pair of latching portions 310a. A curled portion 322a of the clip 300a may engage with a curled portion 153 of a back cover 150. An inclined portion 321a may be connected to the curled portion 322a. The inclined portion 321a may be connected to the first body 330a.

A rear wall 151 of the back cover 150 may cover at least one of a main frame 130, a rear wall 108 of the front cover 105, and a bottom frame 140. A side wall 152 may be connected to the rear wall 151. The side wall 152 of the back cover 150 may face the side wall 107 of the front cover 105. A latching portion 153 may be connected to the side wall 152. The latching portion 153 may be positioned inside the back cover 150. The latching portion 153 may be referred to as the curled portion 153.

Thicknesses of the rear wall 151, the side wall 152, and the curled portion 153 may be the same. The side wall 152 may be formed by bending the rear wall 151 forward. The curled portion 153 may be formed by rounding the side wall 152.

A radius of curvature of the curled portion 153 of the back cover 150 may be very close to a radius of curvature of the curled portion 322a of the clip 300a. A diameter D1 of the curled portion 153 may be twice an amount of engagement D2 between the back cover 150 and the clip 300a. The diameter D1 of the curled portion 153 may be 1.8 to 2.2 times the amount of engagement D2 between the back cover 150 and the clip 300a. The back cover 150 can be easily fastened to the clip 300a. The back cover 150 can be easily separated from the clip 300a.

The curled portion 153 may be positioned between the hook 107a and a stopper 107b. The stopper 107b can limit movement of the curled portion 153 in a forward direction (−z axis direction). A height D3 of the stopper 107b may be very close to a height D4 from the side wall 107 to a center of the curled portion 153. The height D3 of the stopper 107b may be greater than the height D4 from the side wall 107 to the center of the curled portion 153.

Referring to FIGS. 20, 24, 25 and 26, a clip 300b may be fastened to a side wall 107. A latching portion 310b may be caught by a hook 107a. A first part 313b may be positioned in front of the hook 107a. A second part 312b may be connected to the first part 313b. The second part 312b may extend along the hook 107a. A third part 311b may be connected to the second part 312b. The third part 311b may extend along the side wall 107.

A first body 330b may be connected to the third part 311b. The first body 330b may contact a rear end of the side wall 107.

A second body 340b may be connected to the first body 330b. The second body 340b may be inserted into a hole 108a. The second body 340b may be positioned in a space S3.

A third body 350b may be connected to the second body 340b. The third body 350b may have an inclination with respect to the side wall 107. A space S7 may be formed between the third body 350b and the side wall 107. The clip 300b can be easily separated from a front cover 105 due to the third body 350b.

A stepped portion 107d may be formed in the side wall 107. The clip 300b can be easily separated from the front cover 105 due to the stepped portion 107d.

The latching portions 310b may be formed as a pair. A fastening portion 320b may be formed between the pair of latching portions 310b. A curled portion 322b of the clip 300b may engage with a curled portion 153 of a back cover 150. An inclined portion 321b may be connected to the curled portion 322b. The inclined portion 321h may be connected to the first body 330b.

A radius of curvature of the curled portion 153 of the back cover 150 may be very close to a radius of curvature of the curled portion 322b of the clip 300h. A diameter D1 of the curled portion 153 may be twice an amount of engagement D5 between the back cover 150 and the clip 300b. The diameter D1 of the curled portion 153 may be 1.8 to 2.2 times the amount of engagement D5 between the back cover 150 and the clip 300h. The back cover 150 can be easily fastened to the clip 300b. The back cover 150 can be easily separated from the clip 300h.

A height D7 of the stopper 107b may be very close to a height D6 from the side wall 107 to a center of the curled portion 153. The height D7 of the stopper 107b may be greater than the height D6 from the side wall 107 to the center of the curled portion 153.

Figure 20:
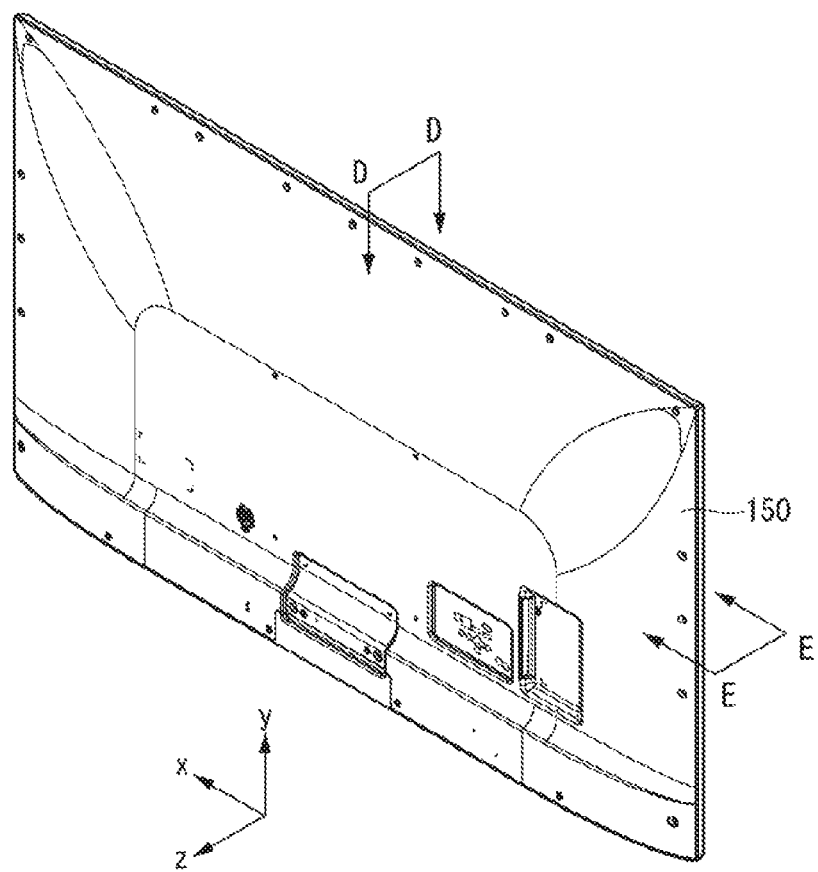
Figure 21:
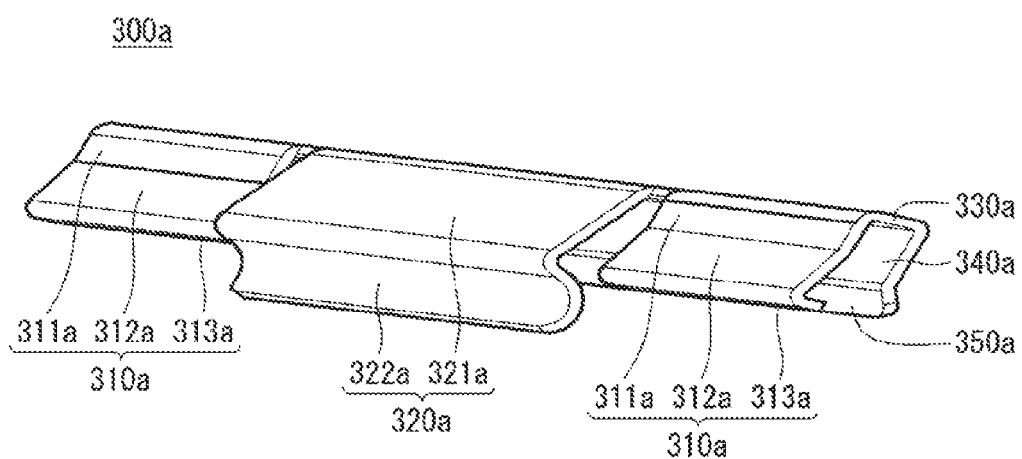
Figure 22:
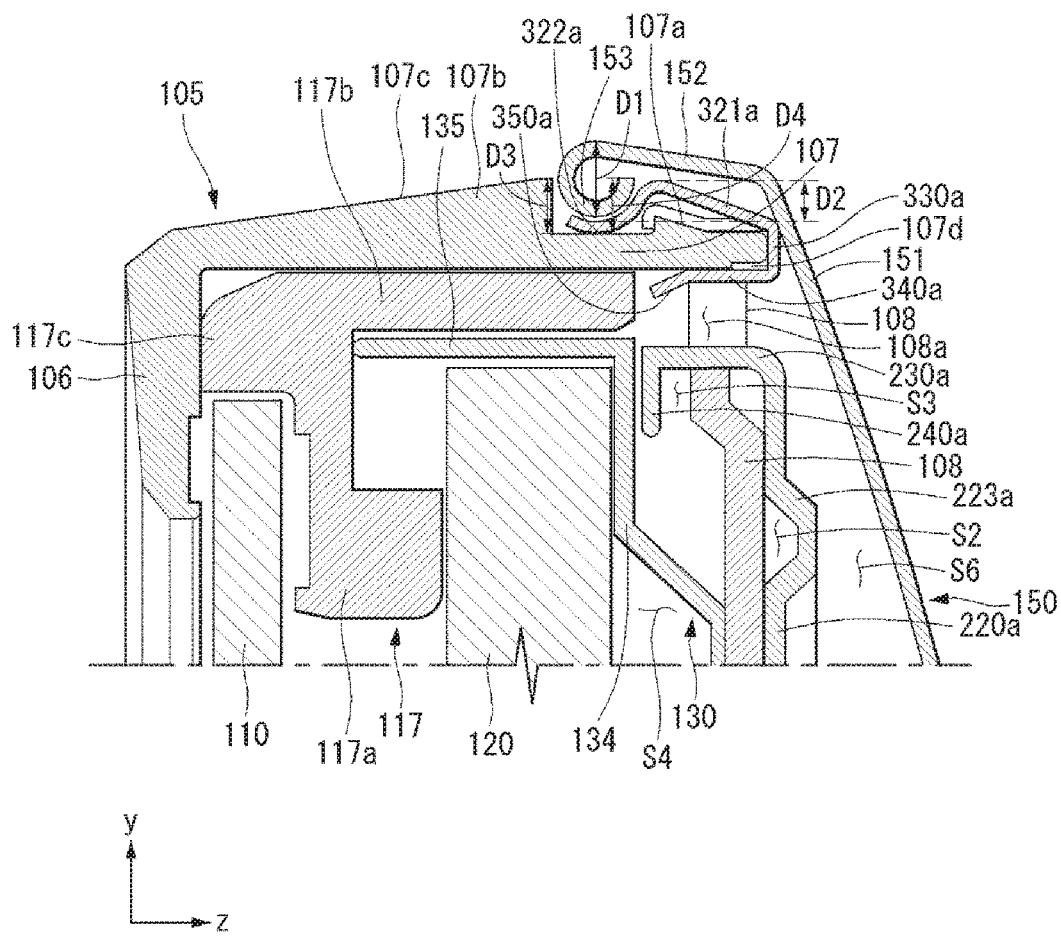
Figure 23:
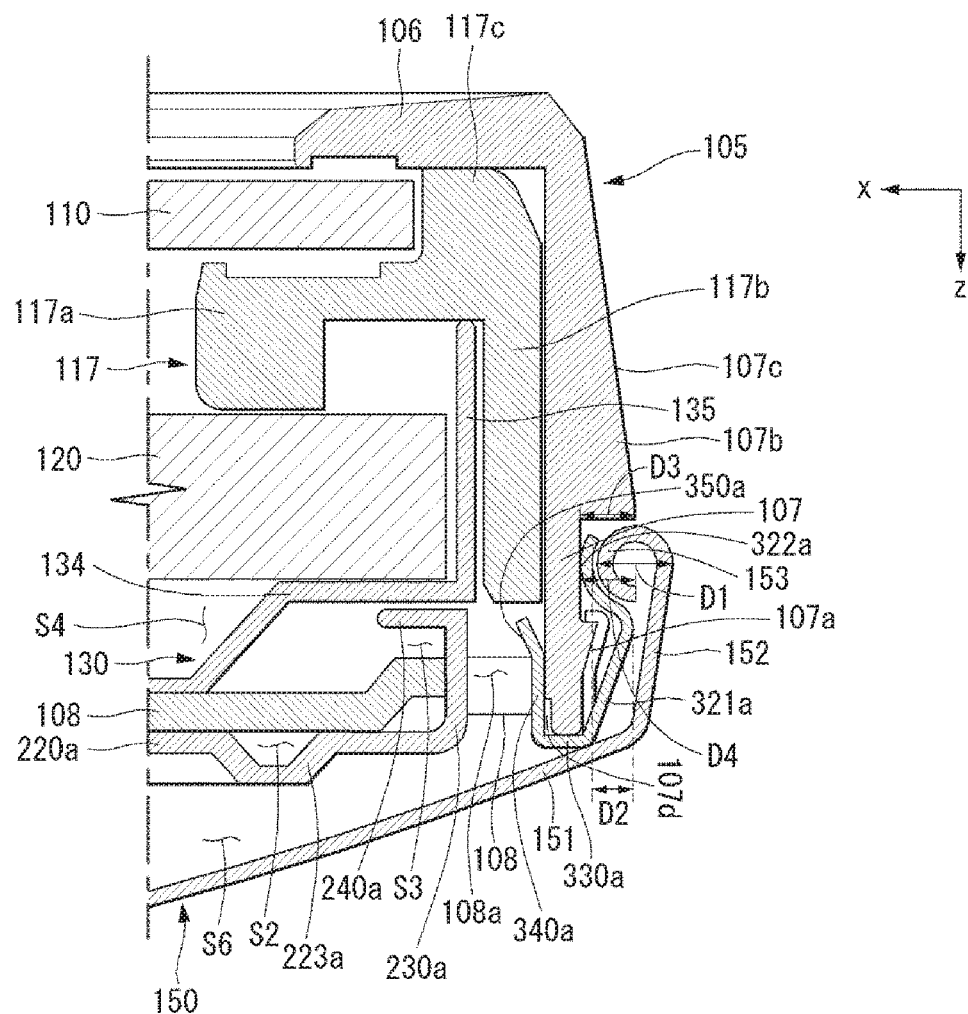
Figure 24:
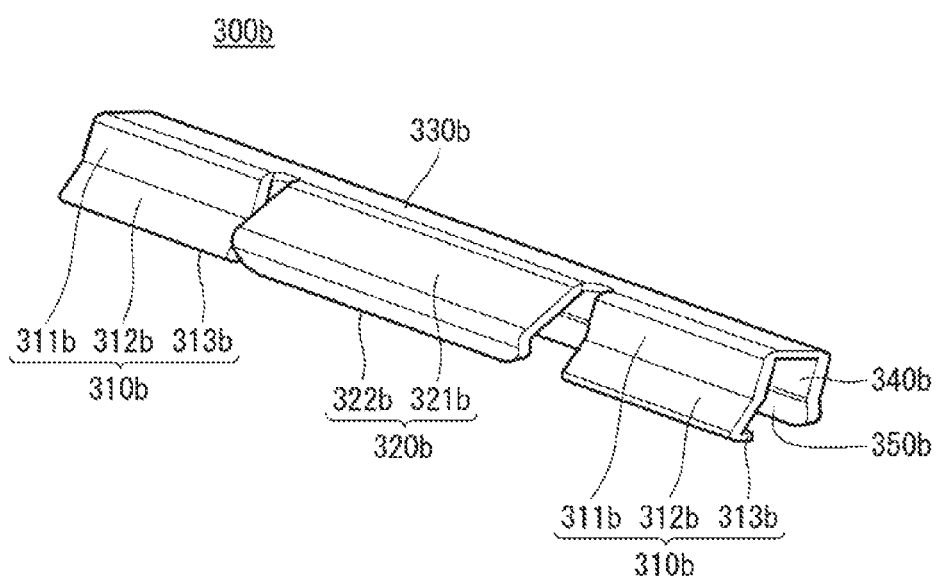
Figure 25:
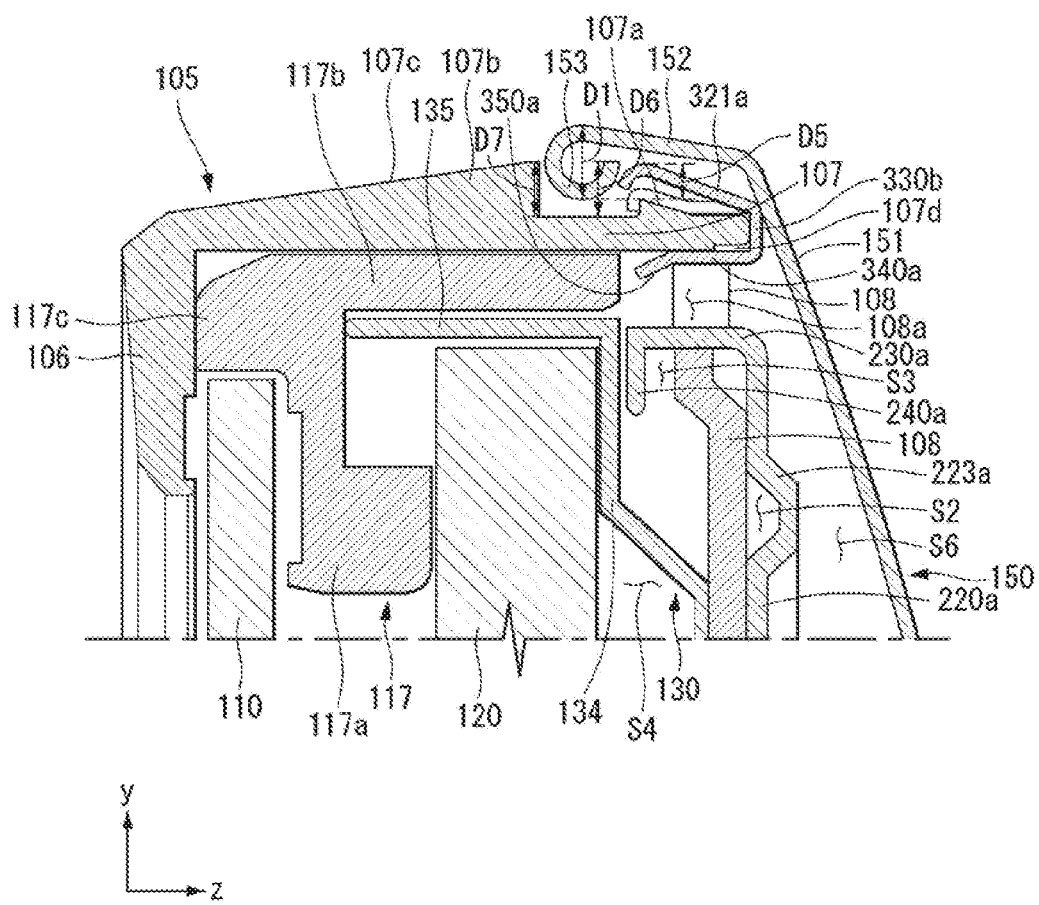
Figure 26:
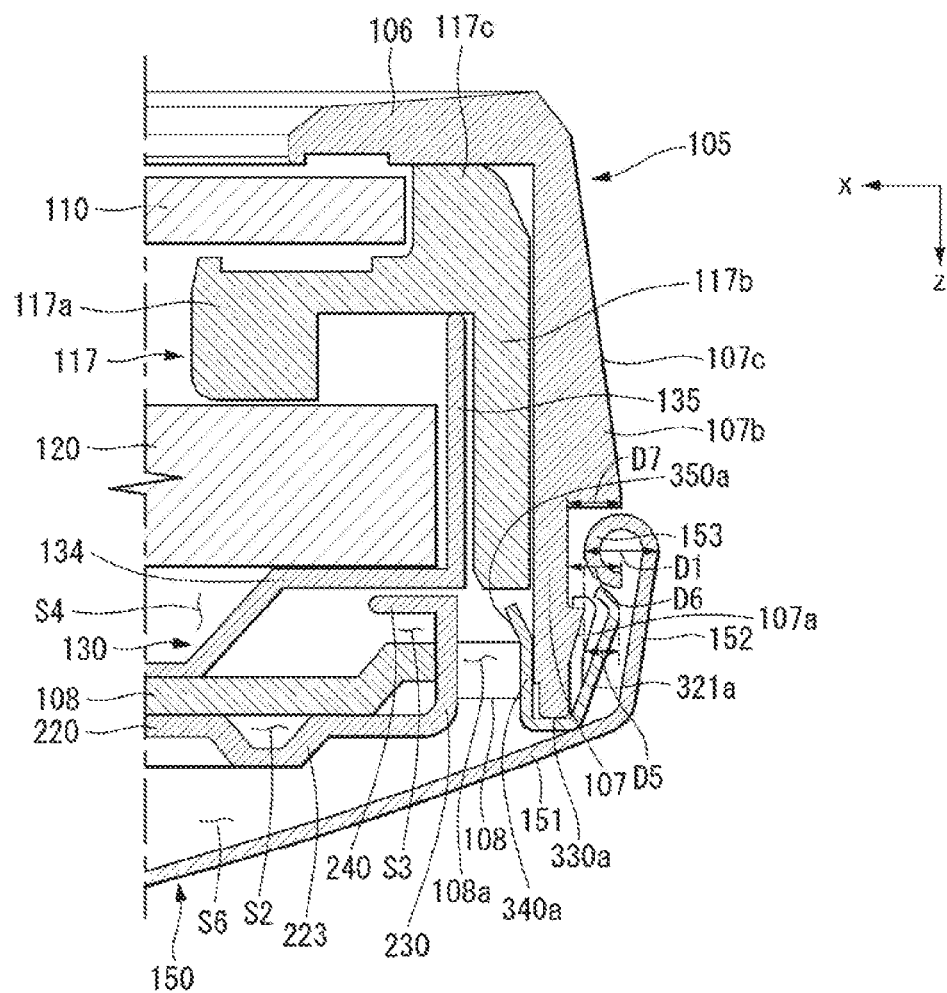
Figure 27:
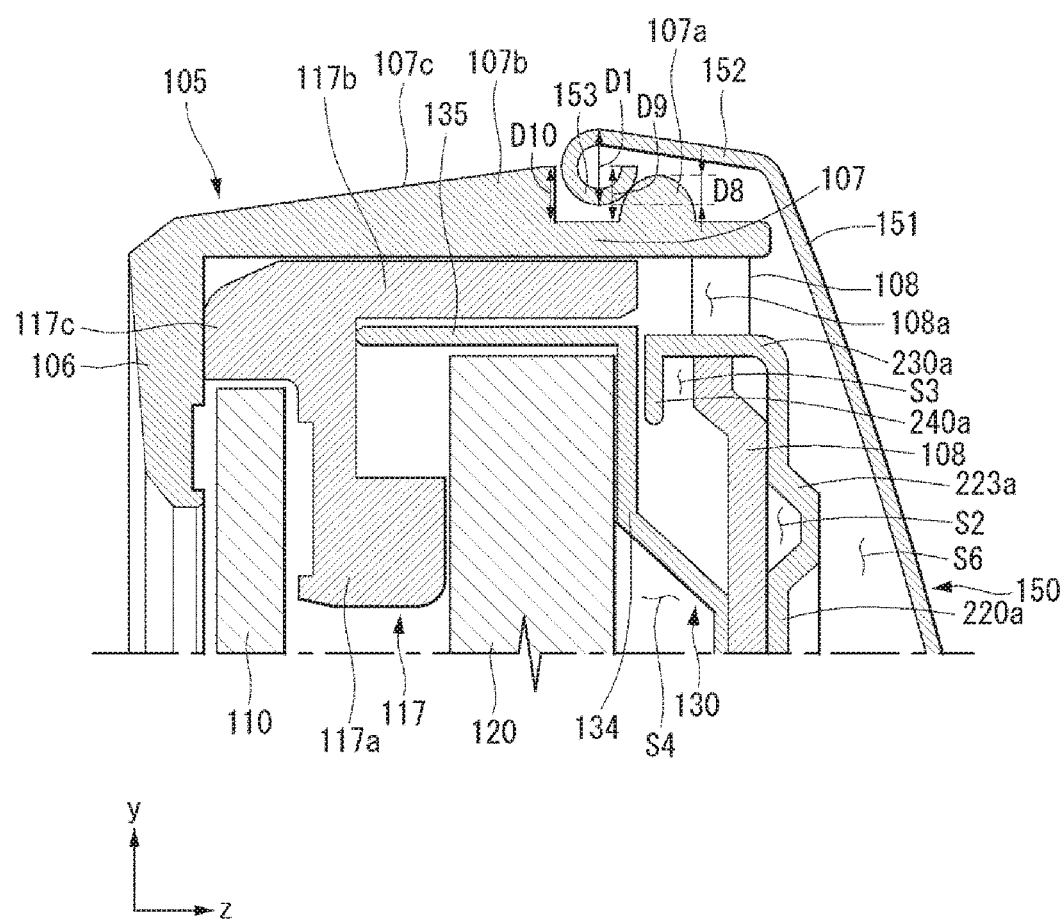
Figure 28:
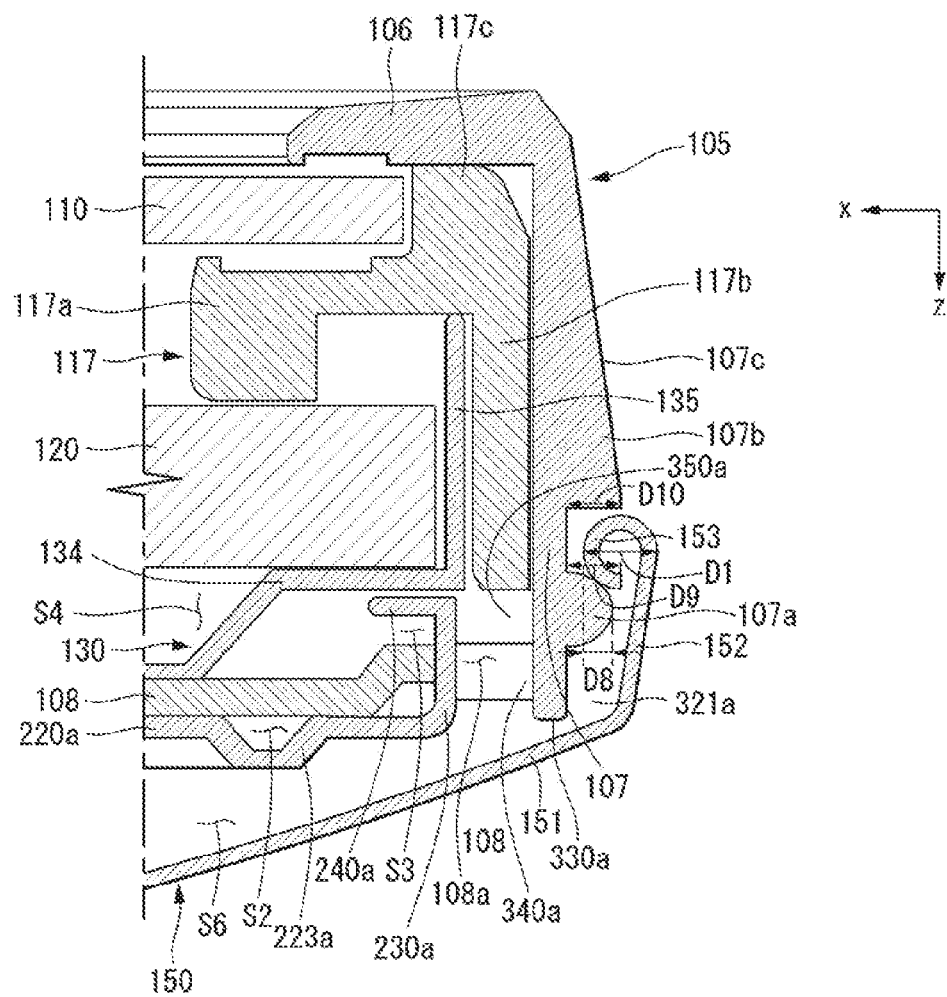

Referring to FIGS. 20, 27, and 28, a back cover 150 may be fastened to a side wall 107. A curled portion 153 may be caught by a hook 107a.

A diameter D1 of the curled portion 153 may be twice an amount of engagement D8 between the back cover 150 and the hook 107a. The diameter D1 of the curled portion 153 may be 1.8 to 2.2 times the amount of engagement D8 between the back cover 150 and the hook 107a The back cover 150 can be easily fastened to the hook 107a. The back cover 150 can be easily separated from the hook 107a.

A height D10 of the stopper 107b may be very close to a height D9 from the side wall 107 to a center of the curled portion 153. The height D10 of the stopper 107b may be greater than the height D9 from the side wall 107 to the center of the curled portion 153.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art

What is claimed is:

1. A display device, comprising:
    a display panel;
    a front cover including:
        a first side wall covering one side of the display panel; and
        a hook provided on an outer surface of the first side wall;
    a back cover coupled to the front cover, the back cover including:
        a first rear wall positioned behind the front cover;
        a second side wall bent forward from the first rear wall towards the front cover, the second side wall covering the first side wall; and
        a first latching portion bent to extend inward from the second side wall, the first latching portion engaging the hook; and
    a frame positioned between the display panel and the back cover,
    wherein the front cover includes a second rear wall positioned behind the frame, the second rear wall being connected to the first side wall, and
    wherein the front cover includes a first hole in the second rear wall, the first hole being adjacent to the first side wall.

2. The display device of claim 1, wherein the first side wall includes a stopper formed on an outer surface of the first side wall, the stopper being positioned in front of the hook such that the first latching portion is positioned between the stopper and the hook.

3. The display device of claim 1, wherein a height from the outer surface of the first side wall to the first latching portion is greater than a height from the outer surface of the first side wall to the hook.

4. The display device of claim 1, wherein the first latching portion is a rounded portion of the second side wall.

5. The display device of claim 1, wherein the front cover includes a front wall facing a front surface of the display panel, the front wall being connected to the first side wall.

6. The display device of claim 1, further comprising a clip, the clip including:
    a second latching portion engaging the hook of the first side wall;
    a fastening portion engaging the first latching portion of the back cover;
    a clip first body facing a rear end of the first side wall, the clip first body being connected to the second latching portion and the fastening portion; and
    a clip second body connected to the clip first body, the clip second body being inserted into the first hole.

7. The display device of claim 6, wherein the first latching portion is a rounded portion of the second side wall of the back cover, and
    wherein the fastening portion has a curved surface extending along the first latching portion.

8. The display device of claim 6, wherein the second latching portion is formed as a pair, and
    wherein the fastening portion is positioned between the pair of second latching portions.

9. The display device of claim 6, wherein the clip second body contacts an inner surface of the first side wall, and
    wherein the clip includes a clip third body connected to the clip second body, the clip third body extending at an inclination with respect to the first side wall.

10. The display device of claim 6, wherein the first side wall includes a stepped portion facing the clip first body and the clip second body.

11. The display device of claim 1, further comprising a fixer, the fixer including:
- a fixer third body fastened to the second rear wall; and
- a fixer fourth body extending forward from the fixer third body, the fixer fourth body being inserted into the first hole, and the fixer fourth body contacting a circumferential surface of the first hole.

12. The display device of claim 11, further comprising a fastening member passing through the fixer third body, the second rear wall, and the frame.

13. The display device of claim 11, wherein the fixer includes a rigid portion bent rearward from the fixer third body, and
- wherein the rigid bent portion and the second rear wall define a space.

14. The display device of claim 11, wherein the fixer includes a fixer fifth body extending along the fixer third body from the fixer fourth body.

15. The display device of claim 11, wherein the fixer includes a fixer sixth body connected to the fixer third body, the fixer sixth body extending at an inclination with respect to the fixer third body.

16. The display device of claim 11, wherein the fixer third body includes a second hole,
- wherein the fixer third body contacts the frame, and
- wherein the frame includes a protrusion protruding rearward and inserted into the second hole.

17. The display device of claim 1 further comprising a guide panel located between the display panel and the frame.

18. The display device of claim 17, further comprising a back light unit located between the guide panel and the frame.

* * * * *